United States Patent
Eliyahu

(10) Patent No.: US 10,968,786 B2
(45) Date of Patent: Apr. 6, 2021

(54) EXPLOITING CONDENSATION HEAT IN HEAT ENGINES

(71) Applicant: EXENCY LTD., Moshav Shahar (IL)

(72) Inventor: Nitzan Eliyahu, Moshav Shahar (IL)

(73) Assignee: EXENCY LTD.

( * ) Notice: Subject to any disclaimer, the term of this patent is extended or adjusted under 35 U.S.C. 154(b) by 84 days.

(21) Appl. No.: 16/319,426

(22) PCT Filed: Jul. 21, 2017

(86) PCT No.: PCT/US2017/043335
§ 371 (c)(1),
(2) Date: Jan. 21, 2019

(87) PCT Pub. No.: WO2018/017980
PCT Pub. Date: Jan. 25, 2018

(65) Prior Publication Data
US 2019/0331006 A1    Oct. 31, 2019

Related U.S. Application Data

(60) Provisional application No. 62/365,024, filed on Jul. 21, 2016.

(51) Int. Cl.
*F01K 25/06* (2006.01)
*F01K 23/08* (2006.01)
(Continued)

(52) U.S. Cl.
CPC .............. *F01K 23/08* (2013.01); *F01K 23/04* (2013.01); *F01K 23/065* (2013.01); *F01K 25/06* (2013.01);
(Continued)

(58) Field of Classification Search
CPC ... F01K 7/10; F01K 7/34; F01K 7/345; F01K 7/36; F01K 7/40; F01K 13/00;
(Continued)

(56) References Cited

U.S. PATENT DOCUMENTS

| 3,006,146 A | 10/1961 | Jackson |
| 4,406,135 A | 9/1983 | Rojey et al. |

(Continued)

FOREIGN PATENT DOCUMENTS

WO    WO 2018/017980 A1    1/2015

OTHER PUBLICATIONS

Antonelli et al. "Operating maps of a rotary engine used as an expander for micro-generation with various working fluids" Applied Energy. Jan. 1, 2014;113:742-50.
(Continued)

*Primary Examiner* — Mark A Laurenzi
*Assistant Examiner* — Xiaoting Hu
(74) *Attorney, Agent, or Firm* — Pearl Cohen Zedek Latzer Baratz LLP; Aryeh Rosenzweig

(57) ABSTRACT

An improved heat engine employing a dual-component working fluid and configured to generate internal heat from one component of the working fluid that heats the other component through the physical contact between them such that together with the addition of external heat, the engine advantageously yields enhanced work extraction efficiency through separate, parallel expansion of each of the working fluids.

2 Claims, 18 Drawing Sheets

(51) Int. Cl.
  *F03G 7/06* (2006.01)
  *F16T 1/00* (2006.01)
  *F01K 23/04* (2006.01)
  *F01K 23/06* (2006.01)
  *F02B 53/02* (2006.01)
  *F02G 5/00* (2006.01)
  *F02B 53/00* (2006.01)

(52) U.S. Cl.
  CPC ............. *F02B 53/02* (2013.01); *F02G 5/00* (2013.01); *F03G 7/06* (2013.01); *F03G 7/065* (2013.01); *F16T 1/00* (2013.01); *F02B 2053/005* (2013.01)

(58) Field of Classification Search
  CPC .......... F01K 13/02; F01K 23/04; F01K 23/08; F01K 25/06; F01K 9/003; F01K 9/02; F01K 19/10; F02B 2053/005; F02B 53/02; F02G 5/00; F22D 7/04; F28B 3/04; F28B 3/08
  See application file for complete search history.

(56) References Cited

U.S. PATENT DOCUMENTS

| | | | |
|---|---|---|---|
| 5,231,832 A | 8/1993 | Tarman | |
| 5,442,914 A | 8/1995 | Otsuka | |
| 6,422,017 B1 * | 7/2002 | Bassily | F01K 7/40 60/653 |
| 6,523,347 B1 | 2/2003 | Jirnov et al. | |
| 8,082,889 B2 | 12/2011 | Otterstrom et al. | |
| 8,613,195 B2 | 12/2013 | Held et al. | |
| 9,303,533 B2 | 4/2016 | Palmer | |
| 2004/0011038 A1 * | 1/2004 | Stinger | F01K 25/08 60/651 |
| 2007/0119175 A1 | 5/2007 | Ruggieri et al. | |
| 2011/0167826 A1 | 7/2011 | Uehara | |
| 2012/0227925 A1 * | 9/2012 | Sweeney | F28D 20/02 165/10 |
| 2012/0255303 A1 * | 10/2012 | Labbe | F01K 25/08 60/651 |
| 2012/0317983 A1 | 12/2012 | Kalina | |
| 2013/0098029 A1 | 4/2013 | Pinto et al. | |
| 2014/0096524 A1 | 4/2014 | Held et al. | |
| 2015/0176436 A1 | 6/2015 | Palmer | |
| 2015/0377080 A1 | 12/2015 | Fortini et al. | |
| 2018/0328235 A1 | 11/2018 | Eliyahu | |

OTHER PUBLICATIONS

International Search Report for corresponding PCT Application No. PCT/US2017/043335 dated Dec. 26, 2017.
International Search Report for related PCT Application No. PCT/IL2019/050848 dated Nov. 20, 2019.
Supplementary European Search Report for corresponding European Application No. 17831972.9 dated Feb. 21, 2020.

* cited by examiner

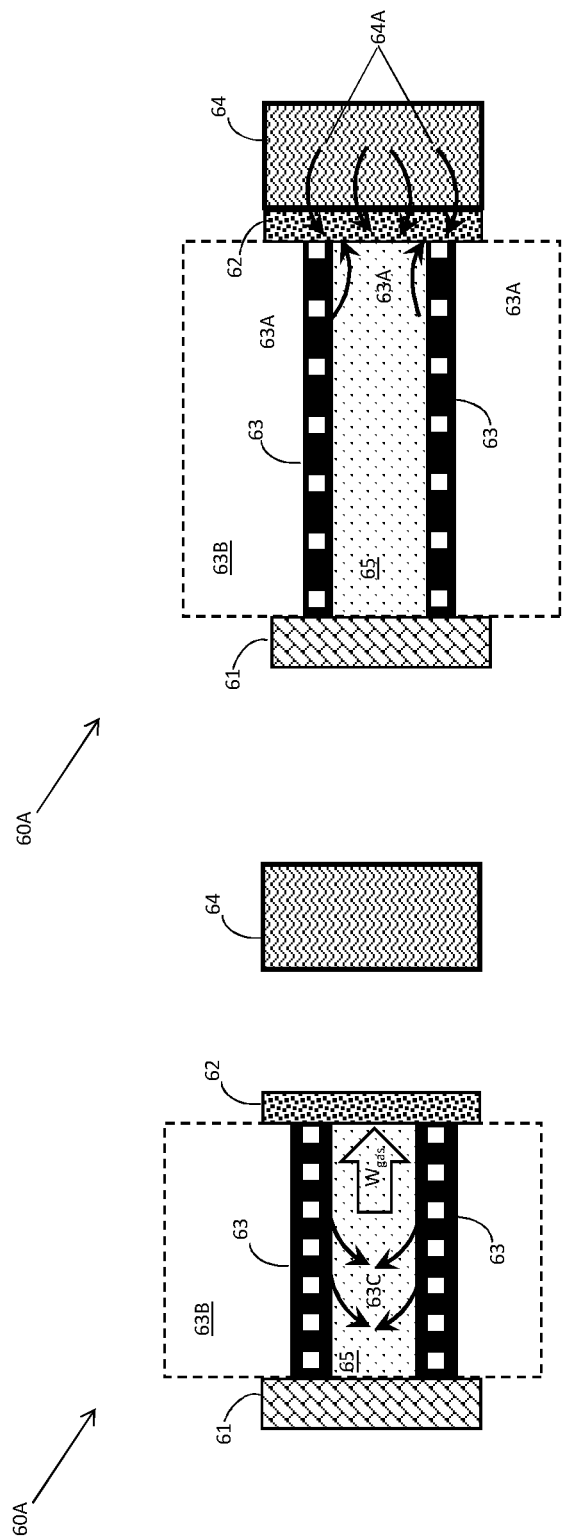

EXPLOITING CONDENSATION HEAT IN HEAT ENGINES

BACKGROUND OF THE INVENTION

The world of engines encountered a problem with the development of the internal combustion engine. The mindset in the art was that introduction of the combustion into the engine will improve engine function by maximizing the temperature difference between the heat source and the heat sink; and indeed, this was the case when compared with the old steam engines employing external combustion. however, this gain in efficiency was offset by the inefficient practice of heat discharge either generated from compression or released after expansion.

There are systems developed to increase utilization of the discarded heat. However, these systems many times are implemented as cogeneration units utilizing discarded residual heat from expansion and not pre-expansion compression heat. Certain large compression systems employ compression heat for heating, while compressed air energy storage systems use the compression heat as a form of energy storage. Neither use pre-expansion compression heat or intermediate temperature condensation heat to increase work output of a heat engine.

In view of the fact that the discharged pre-expansion compression heat or intermediate condensation heat contributes to engine inefficiency, there is a need to utilize this internally generated heat to increase engine efficiency in the production of work.

SUMMARY OF THE INVENTION

According to the teachings of the present invention there is provided a method of heating with internally generated heat in a heat engine, the method including providing a two-component working fluid having a first working fluid and a second working fluid, each of the working fluids in physical contact with each other; generating an internal heat from a first working fluid; capturing in the second working fluid a portion of the internal heat of the first working fluid through the physical contact with each other; heating the first working fluid and the second working fluid with an external heat; and separately expanding the first working fluid and the second working fluid in parallel so as to extract work from each component of the two-component working fluid.

According to a further feature of the present invention, the capturing in the second working fluid a portion of the internal heat of the first working stream is implemented until each the components of the two-component working stream has a substantially identical temperature.

According to a further feature of the present invention, the first working fluid is implemented as liquid working fluid.

According to a further feature of the present invention, the second working fluid is implemented as a liquid working fluid.

According to a further feature of the present invention, the internal heat is implemented as condensation heat released from condensation of the second liquid working liquid.

According to a further feature of the present invention, there is also provided extracting work through condensation of the second liquid working fluid.

According to a further feature of the present invention, the second working fluid is implemented as a liquid identical to the first liquid working fluid.

According to a further feature of the present invention, the second working fluid is implemented as a liquid non-identical to the first liquid working fluid.

According to a further feature of the present invention, the first working fluid is implemented as a gas working fluid.

According to a further feature of the present invention, the internal heat is implemented as polytropic compression heat of the gas working fluid.

According to a further feature of the present invention, there is also provided extracting work through condensation of the second liquid working fluid.

There is also provided according to the teachings of the present invention, a heat engine pre-heating with internal heat of working fluid, the engine including a two-component working fluid having a first working fluid and a second working fluid, each of the working fluids in physical contact with each other; an internal heater configured to generate internal heat from the first working fluid; a splitter configured to split the two-component working fluid into separate components; and two parallel adiabatic expander sets, each set configured to separately extract work from one component of the two-component heat engine in parallel.

According to a further feature of the present invention, the splitter is configured to split the two-component working fluid into separate components after each component of the two-component working fluid is at a substantially identical temperature.

According to a further feature of the present invention, the first working fluid is implemented as liquid working fluid.

According to a further feature of the present invention, the second working fluid is implemented as a liquid working fluid.

According to a further feature of the present invention, the internal heater is implemented as condenser combiner configured to release heat of condensation of the second liquid working liquid and combine the second liquid working liquid with the first working liquid.

According to a further feature of the present invention, the condenser combiner is implemented as a Wankel condenser combiner.

According to a further feature of the present invention, there is also provided a Wankel condenser configured to extract work through condensation of the second liquid working fluid.

According to a further feature of the present invention, the second working fluid is implemented as a liquid identical to the first liquid working fluid.

According to a further feature of the present invention, the second working fluid is implemented as a liquid non-identical to the first liquid working fluid.

According to a further feature of the present invention, the first working fluid is implemented as a gas working fluid.

According to a further feature of the present invention, the internal heater includes a compression unit configured to polytropic compress the gas working fluid.

According to a further feature of the present invention, the compression unit includes an ejector.

According to a further feature of the present invention, the compression unit includes a liquid ring compressor linked to the ejector.

According to a further feature of the present invention, the compression unit includes a liquid ring compressor.

According to a further feature of the present invention, each of the adiabatic expander sets includes a Wankel expander.

There is also provided according to the teachings of the present invention, a heat engine having two-component working fluid, the heat engine including a sleeve of shape-memory material; a heat block enclosing at least one end of the sleeve; and a pressurized gas sealed within the sleeve and the heat block such that a combination of low-temperature heat generated from sleeve stretching and high-temperature heat captured by the heat block initiates contraction of the sleeve and heat released from sleeve contraction into the gas drives gas expansion so as to generate a linear reciprocity.

BRIEF DESCRIPTION OF THE DRAWINGS

The subject matter regarded as the invention is particularly pointed out and distinctly claimed in the concluding portion of the specification. The features, operation and advantages of the invention are best understood in reference to the following detailed description in view of the accompanying drawings in which:

FIGS. 9D and 9E are schematic, cross-sectional views of the engine of FIG. 9A depicting internal heat transfer and resulting work generation, according to an embodiment;

Figure 1B:
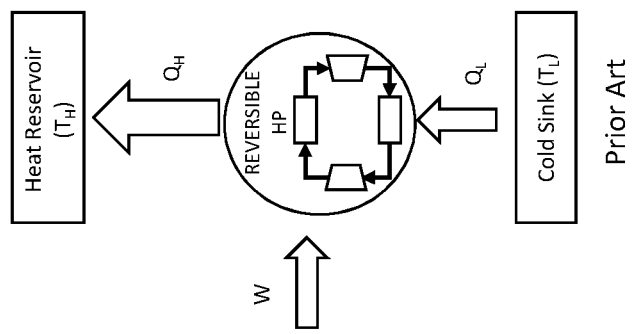
FIG. 1B is a general energy flow diagram of a traditional reversible heat pump, in accordance with prior art.

It will be appreciated that for the sake of clarity, depicted elements may not been drawn to scale and reference numerals may be repeated among figures to indicate corresponding or analogous elements.

DETAILED DESCRIPTION

The present invention is an improved heat engine exploiting customarily discarded, internally generated heat in the form of either compression heat generated prior to expansion or intermediate condensation heat generated after expansion in a heat engine cycle. The use of this internally generated heat negates the necessity to restore lost energy content of the system to extract work, thereby enabling additional energy supplied to the system to be more efficiently exploited during work extraction. Required entropy increase typically achieved through heat discharge is now achieved also through mixing of the captured of intermediate-temperature compression heat or intermediate-temperature condensation heat and high-temperature external heat supplied to the engine.

The disclosed heat engine replaces the traditional high-temperature, heat source with a combined heat having a medium temperature derived from both the high-temperature heat source and the intermediate temperature, internal heat released prior to expansion from either compression of a working fluid, or in another embodiment, released during working fluid condensation. The reduction of temperature of the combined heat is the chosen tradeoff for the increased energy content; a configuration counter-intuitive to common practice today. The intermediate-temperature heat is recoverable through a second working fluid in physical contact with the working fluid from which the intermediate-temperature heat is emanating.

The following terms will be employed through the present document:

The term "fluid" refers to either a liquid, gas or elastic or variable shape solids.

The term "preliminary heat" refers to internally generated heat released either from pre-expansion compression or condensation of a working fluid implemented as a liquid or gas and heat released from stretching or contraction of a working "fluid" implemented as an elastic solid. It is internally generated heat because the heat is generated from thermodynamic processes, like pressurization, compression, condensation for example, acting on a working fluid employed within the engine and not provided from a heat source external to the engine.

The term "engine" the entire work yielding system regarding the various embodiments. Expanders employed within a system are not deemed engines. In contract, the discussion setting forth the theoretical development, the term "engine" refers to expanders for the sake of clarity.

"Additional" or "external" heat refers to heat provided from a heat source external to the engine.

The term "combined heat" refers to a combination of internally generated intermediary-temperature heat and high temperature heat supplied from a heat source external to the engine. The combined heat drives the engine.

"Integrated work-cycle" refers to a work cycle formed from two parallel work cycles having a degree of overlap during at least one stage of their respective cycles.

"Intermediary condensation" refers to condensation that occurs at an intermediate temperature.

The abbreviation "LP" refers to low pressure.
The abbreviation "MP" refers to medium pressure.
The abbreviation "MHP" refers to medium high pressure.
The abbreviation "HP" refers to high pressure.

It should be appreciated that these terms, and similarly terms of relative temperature, emphasize relative values to each other and are not intended to denote a particular numerical value.

In reference to the relative temperature differences between various heat reservoirs and heat sinks, the abbreviation "$T_L$" refers to a low temperature of the surroundings; "$T_H$" refers to a high temperature of heat external to the engine, and "$T_M$" or "$T_{combined}$" refers to a medium temperature.

Intermediary or intermediate heat refers to heat generated internal to the engine and has an intermediate temperature that is greater than low temperature and less than high temperature external heat. Heat combined from external and intermediary heat is deemed to have a medium temperature for the purposes of this document.

The term "polytropic" refers to process in which the polytropic index, n is between 1 and γ; the ratio of heat capacities $C_p/C_v$. For the purposes of this document, polytropic expansion has a polytropic index n different than that of polytropic compression. Polytropic expansion refers to processes in which the polytropic index n is between γ and the polytropic index of compression whereas polytropic compression has a polytropic index n is closer to 1.

The following details are set forth to provide a thorough understanding of the invention; however, it should be appreciated that the present invention may be practiced without these specific details and that well-known methods, procedures, and components are omitted for the sake of clarity.

Figure 1A:
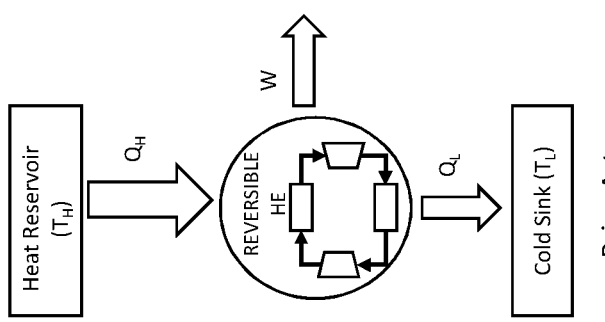
FIG. 1A is general energy flow diagram of a traditional reversible heat engine, in accordance with prior art.

Turning now to the figures, FIG. 1A depicts a general energy flow diagram of a classic reversible heat engine (HE) depicting high-temperature heat $Q_H$ from a hot heat reservoir at high temperature $T_H$ supplied to the engine and low-temperature heat $Q_L$ discharged into a cold heat sink at low temperature $T_L$ in the generation of work W as is known in the art.

In accordance with the first law of thermodynamics:

$$Q_H = W + Q_L$$

The Carnot efficiency of a classic reversible heat engine $\eta_{CE}$ is given as:

$$\eta_{CE} = \frac{|W|}{|Q_H|} = \left(1 - \frac{T_L}{T_H}\right)$$

FIG. 1B depicts a classic reversible heat pump (HP) in which the process is reversed. The Carnot efficiency of such a classic reversible heat pump $K_{CP}$ is given as:

$$K_{CP} = \frac{|Q_L|}{|W|} = \left(\frac{T_L}{T_H - T_L}\right)$$

Figure 1D:
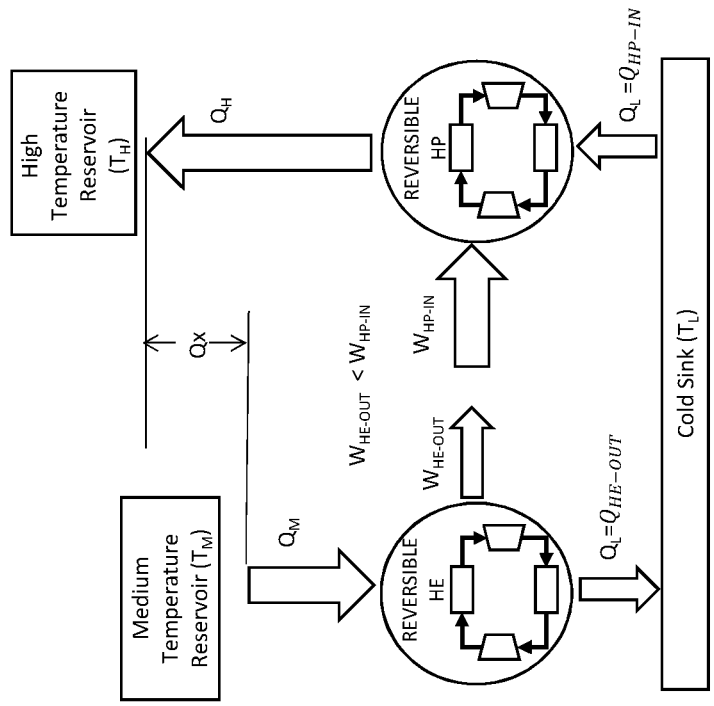
FIG. 1D depicts pump work input and pump heat output required to achieve an engine heat output matching a pump heat input for a reversible heat engine and reversible heat pump functioning independently and sharing a heat sink.
Figure 1C:
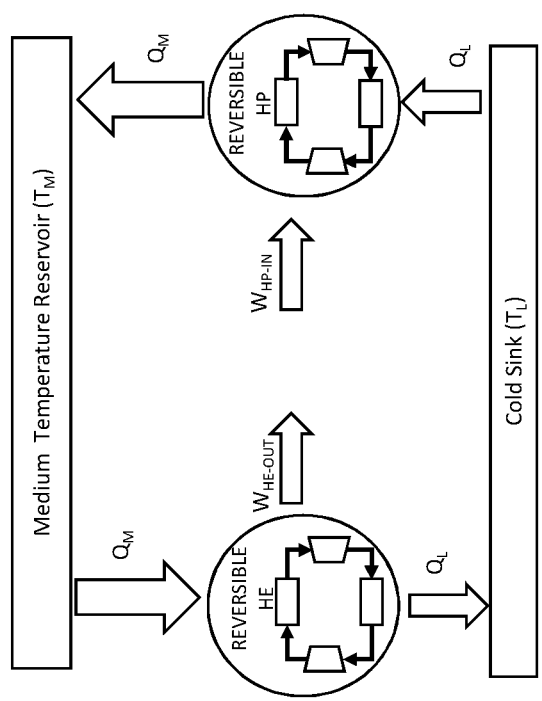
FIG. 1C depicts a non-viable configuration of a reversible heat pump and a reversible heat engine operating between a shared heat source and heat sink.

FIG. 1C depicts a non-viable, theoretical configuration of classic reversible heat engine and classic reversible heat pump having a common medium temperature heat reservoir and low temperature heat sink. As shown, the collective heat and work balance is zero in which there are no net heat losses to the surroundings. Heat intake $Q_M$ of the engine is the same as the heat output $Q_M$ of the pump, and similarly, heat discharge $Q_L$ of the of engine is the same as the heat intake $Q_L$ of the heat pump. Analogously in regards to work, work output $W_{HE-OUT}$ of the engine is the same as work intake $W_{HP-IN}$ of the pump.

However, even on a theoretical level, the absence of an entropy increase of this configuration would render such a configuration inoperative and is a violation of the second law of thermodynamic and would constitute a perpetual motion machine.

FIG. 1D depicts a theoretical configuration of classic reversible heat pump and engine analogous to that depicted in FIG. 1C and is a theoretical model configuration used to determine the provisions needed to render the configuration of FIG. 1C operative and compliant with the second law of thermodynamics.

Assuming the following:
1. The quantity of heat discharged to the cold heat reservoir by the classic reversible heat engine $Q_L$ is equal to the quantity of heat drawn from the cold heat reservoir $Q_L$ by the classic reversible heat pump:

$$Q_L = Q_{HE-OUT} = Q_{HP-IN}$$

2. The temperature of the hot heat reservoir of the classic reversible heat engine is less than the temperature of the hot heat reservoir of the classic reversible heat pump:

$$T_H > T_M$$

In accordance with the first law of thermodynamics:

$$Q_M = W_{HE-OUT} + Q_L$$

$$Q_H = W_{HP-IN} + Q_L$$

The Carnot efficiency of the classic reversible heat engine is:

$$\eta_{CE} = \frac{|W_{HE-OUT}|}{|Q_M|} = \left(1 - \frac{T_L}{T_M}\right)$$

The Carnot efficiency of the classic reversible pump is:

$$K_{CP} = \frac{|Q_L|}{|W_{HP-IN}|} = \left(\frac{T_L}{T_H - T_L}\right)$$

Since the first law of thermodynamics is $Q_L = Q_M - W_{HE-OUT}$ and since the Carnot efficiency of classic reversible heat engine is $$W_{HE-OUT} = \eta_{CE} Q_M = \left(1 - \frac{T_L}{T_M}\right) Q_M$$

it follows:

$$Q_L = Q_M - \left(1 - \frac{T_L}{T_M}\right) Q_M$$

$$Q_L = \frac{T_L}{T_M} Q_M$$

In regard to the classic reversible heat pump, the first law of thermodynamics is $Q_L = Q_H - W_{HP-IN}$ and since the Carnot efficiency of classic reversible pump is $$Q_L = K_{CP} W_{HP-IN} = \left(\frac{T_L}{T_H - T_L}\right) W_{HP-IN}$$

then it follows $$Q_L = \left(\frac{T_L}{T_H - T_L}\right)(Q_H - Q_L)$$

$$Q_L = \left(\frac{T_L}{T_H - T_L}\right) Q_H - \left(\frac{T_L}{T_H - T_L}\right) Q_L$$

$$Q_L(T_H - T_L) = (T_L)Q_H - (T_L)Q_L$$

$$Q_L(T_H) = (T_L)Q_H$$

$$Q_L = \frac{T_L}{T_H} Q_H$$

From here:

$$\frac{T_L}{T_M} Q_M = \frac{T_L}{T_H} Q_H$$

$$Q_M = \frac{T_M}{T_H} Q_H$$

and since $T_H > T_M$ then if follows $Q_H > Q_M$ and from here that $Q_H = Q_M + Q_X$ and since according to a classic reversible heat engine $$W_{HE-OUT} = \left(1 - \frac{T_L}{T_M}\right) Q_M$$

$$W_{HE-OUT} = \left(\frac{T_M - T_L}{T_M}\right) Q_M$$

$$Q_M = \left(\frac{T_M}{T_M - T_L}\right) W_{HE-OUT}$$

Since according to the first law of thermodynamics $Q_L = Q_M - W_{HE-OUT}$ then $$Q_L = \left(\frac{T_M}{T_M - T_L}\right) W_{HE-OUT} - W_{HE-OUT}$$

$$Q_L = \left(\frac{T_M}{T_M - T_L} - 1\right) W_{HE-OUT}$$

$$Q_L = \left(\frac{T_L}{T_M - T_L}\right) W_{HE-OUT}$$

Since Carnot efficiency of a classic reversible heat pump is:

$$Q_L = \left(\frac{T_L}{T_H - T_L}\right) W_{HP-IN}$$

therefore $$\left(\frac{T_L}{T_H - T_L}\right) W_{HP-IN} = \left(\frac{T_L}{T_M - T_L}\right) W_{HE-OUT}$$

Given that $T_H > T_M > T_L$, then $$\left(\frac{T_L}{T_H - T_L}\right) < \left(\frac{T_L}{T_M - T_L}\right)$$

therefore $W_{HP-IN} > W_{HE-OUT}$
From here $W_{HP-IN} = W_{HE-OUT} + W_X$ and from the first law of thermodynamics:

$$W_{HE-OUT} = Q_M - Q_L$$

$$W_{HP-IN} = Q_H - Q_L$$

then when equated $$Q_H - Q_L = Q_M - Q_L + W_X$$

from here $$W_X = Q_H - Q_M$$

and because $$Q_H = Q_M + Q_X$$

then $$W_X = Q_X$$

From here, there needs to be an intermediary irreversible engine between the classic reversible heat engine and the classic reversible heat pump to provide the deficit work between the classic reversible heat engine output $W_{HE-OUT}$ and the classic reversible heat pump requirement $W_{HP-IN}$. The intermediary irreversible engine receives $Q_X$ and converts to $W_X$ which constitutes the difference between the classic reversible heat pump heat output $Q_H$ and the heat of the classic reversible heat engine input $Q_M$. This heat $Q_X$ is rendered theoretically entirely into the deficit work between $W_{HE-OUT}$ and $W_{HP-IN}$ as noted above. The two engines produce more work when only one of them releases heat to the environment and receives heat at the same temperature.

Figure 1E:
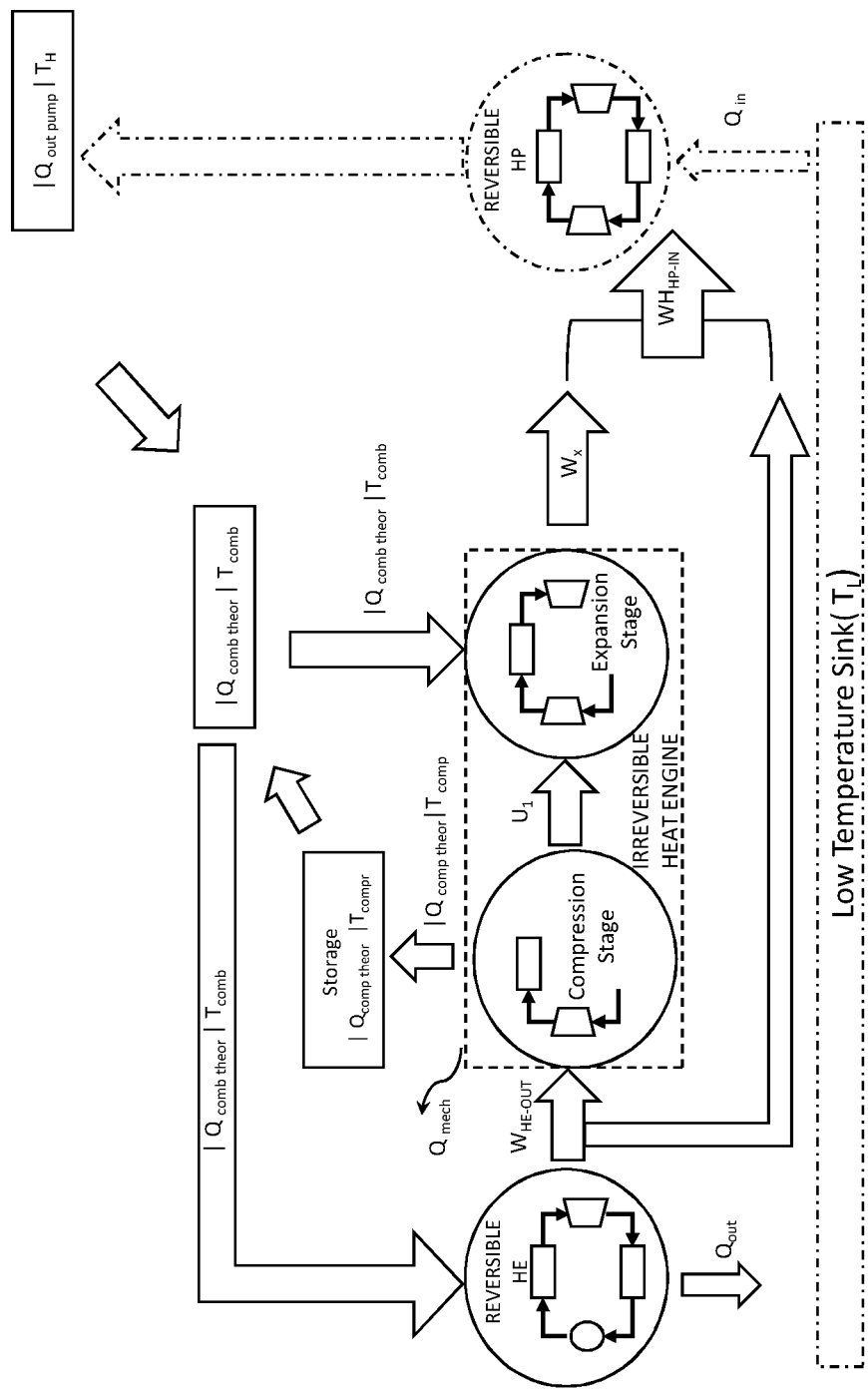
FIG. 1E depicts energy flow of a theoretical two engine configuration, one liquid and one gas, capable of achieving the heat pump input using the heat engine output of the theoretical model depicted in FIG. 1D, according to an embodiment.

FIG. 1E depicts a theoretical energy flow diagram of an irreversible heat engine if it were integrated into a theoretical classic reversible heat engine and classic reversible heat pump arrangement of FIG. 1D to demonstrate the theoretical viability of the irreversible engine as configured.

As shown, the irreversible heat engine, depicted in its compression and expansion stages, provides $W_x$ to make up the difference between the needed classic reversible heat pump work input $W_{HP-IN}$ and the classic reversible heat engine output $W_{HE-OUT}$ as noted above. $W_x$ is provided from $Q_x$ which is the difference of the theoretical, classic reversible heat-pump output $Q_{out\,pump}$ and the theoretical, classic reversible heat-engine input $Q_{in\,engine}$ as denoted in FIG. 1D. In this theoretical model, $Q_x$ is implemented as theoretical combined heat $Q_{comb\,theor}$ derived from a heat mix of theoretical compression $Q_{comp\,theor}$ and theoretical, classic reversible heat-pump output $Q_{out\,pump}$; accordingly, theoretical combined heat $Q_{comb\,theor}$ has a temperature $T_{comb}$ lower than that the temperature of theoretical, classic reversible heat-pump output $Q_{out\,pump}$.

Theoretical combined heat $Q_{comb\,theor}$ theoretically drives the classic reversible heat engine and boosts the energy content U of the working fluid to achieve a work output level meeting the work requirements of the theoretical classic reversible heat pump as noted above.

In this manner the irreversible heat engine is theoretically viable because of the entropy increase emanating from the above noted combination of different heats and rejection of heat to the surroundings from one of the two working streams. It should be appreciated that in practical implementation of the heat engine will function at a less than ideal efficiency in view of mechanical and system heat losses $Q_{mech}$ as is known to those skilled in the art.

Figure 1F:
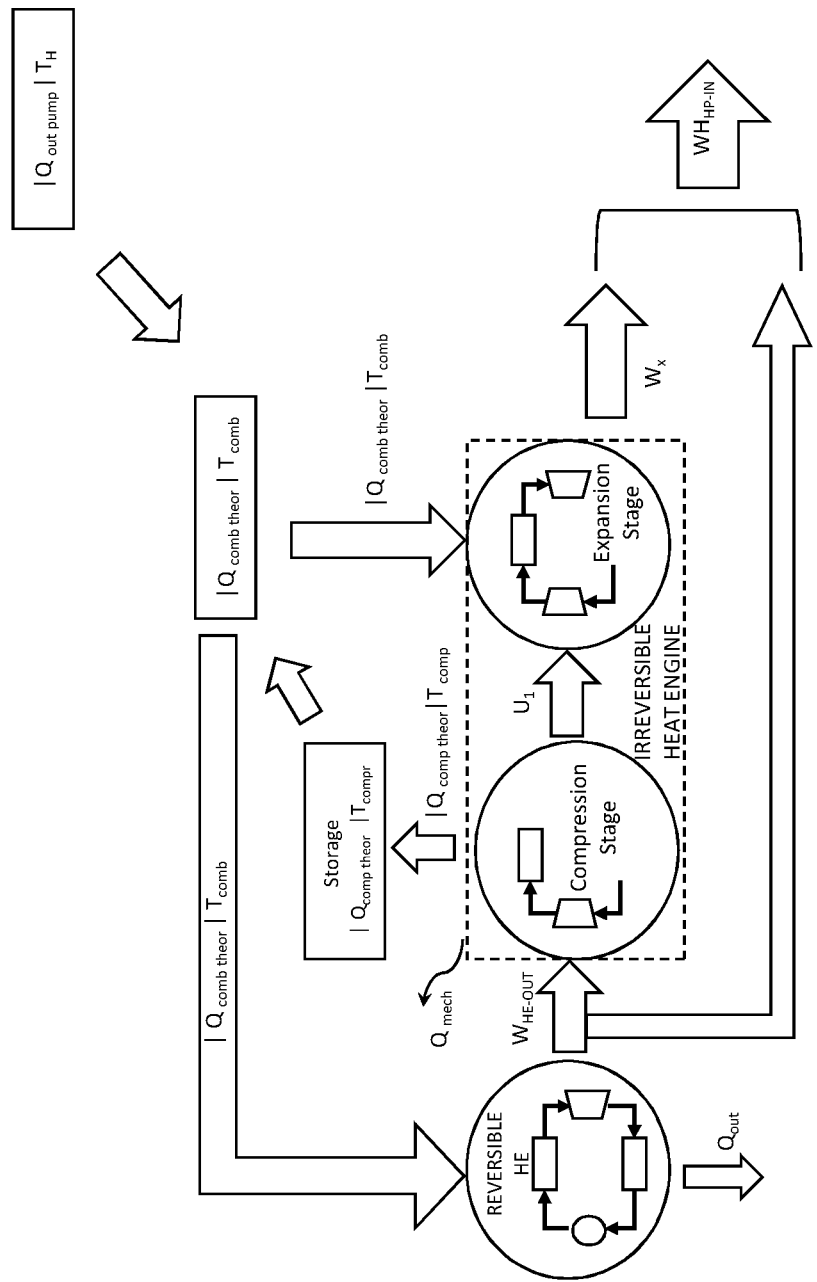
FIG. 1F depicts a configuration of two theoretical engines operating from the same temperature heat source in which only one rejects heat to the heat sink; according to and embodiment.

FIG. 1F depicts a configuration of two theoretical liquid and gas engines operating from the same temperature heat source in which one only rejects heat to the heat sink. As shown, not all of the preliminary work heat is directed to the intermediary engine and the intermediary can receive heat from combined heat and return heat to create combined heat.

Figure 1G:
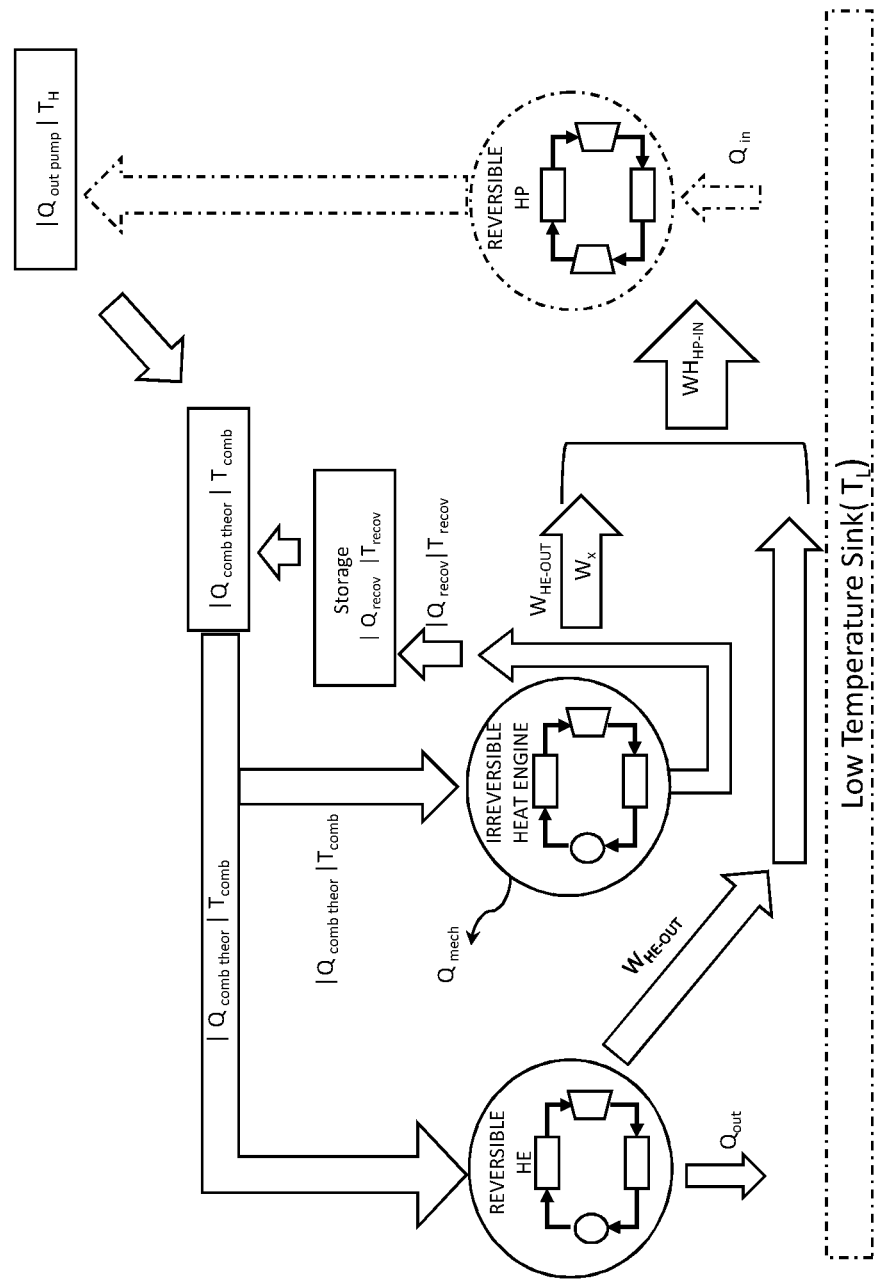
FIG. 1G is a general energy flow diagram of a practical, two-liquid implementation of the irreversible heat engine of FIG. 1E in the absence of work input, according to an embodiment.
Figure 1H:
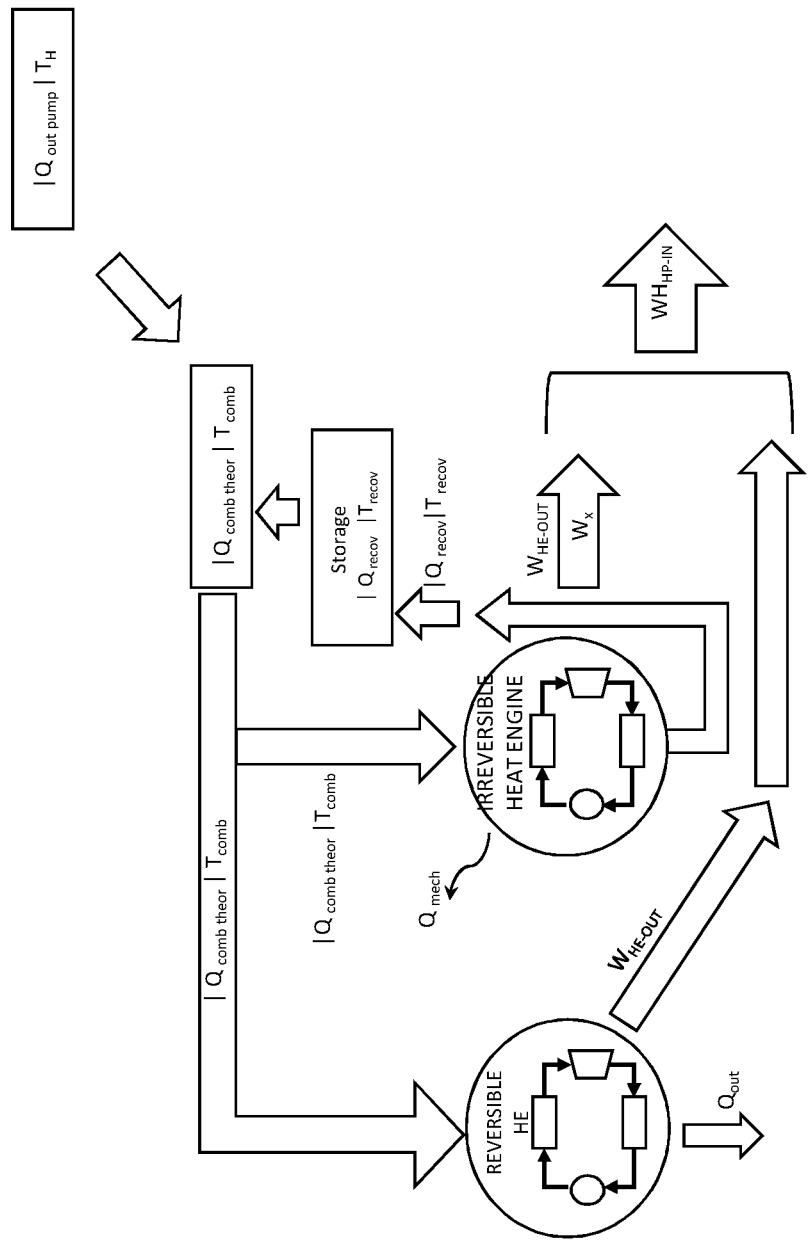
FIG. 1H is a general energy flow diagram of a practical, two-liquid implementation of the irreversible heat engine of FIG. 1G in the absence of work input, according to an embodiment.

FIG. 1G depicts energy flow of a theoretical two engine configuration, one liquid and the other also employing liquid, capable of achieving the heat pump input using the heat engine output of the theoretical model depicted in FIG. 1D, according to an embodiment;

FIG. 1H depicts a configuration of two theoretical engines, each employing a liquid, operating from the same temperature heat source in which only one rejects heat to the heat sink; according to an embodiment.

Following are general features employed to implement the above theory and highlighted through comparison with traditional engines and accepted practice where appropriate. Without diminishing in scope, these features are set forth for an engine employing a compressible working fluid.

In the instant engine, part of the entropy increase is achieved through mixing of different temperature heats into combined heat during the engine cycle prior to work generation. In contrast, traditional engines entropy increase is achieved through discharge of heat at the end of the work cycle.

In the instant engine, efficiency is enhanced through physical placement of the heat source in a location removed from the engine to facilitate mixing of low-temperature compression and high-temperature external. In contrast, the heat source of traditional engines is juxtaposed to the engine to increase efficiency.

In the instant engine, stored compression heat advantageously enables a wide variety of applications. In contrast, traditional engines typically transform heat energy into work in the absence of heat storage capacity.

Figure 2:
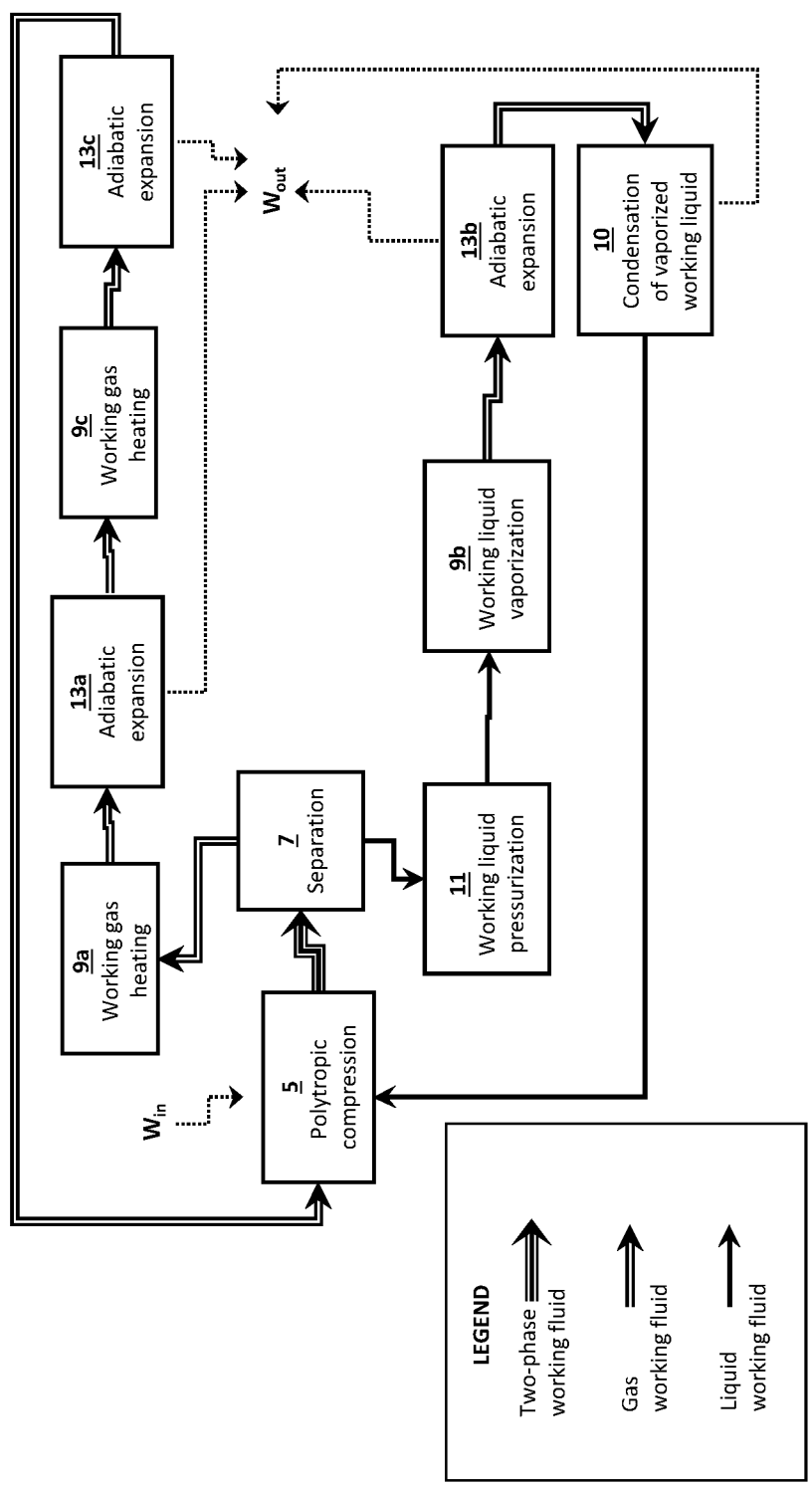
FIG. 2 is a block flow diagram of a first embodiment of heat engine cycle employing a two-component working fluid in which the two-component working fluid is implemented as a gas-liquid working fluid, according to an embodiment.

FIG. 2 is a block flow diagram depicting a process scheme in which the two-component working fluid is implemented as a two-phase working fluid of gas and liquid in physical contact with other. Suitable liquids include, refrigerants R123, R245fa, Toluene, Heptane, Pentane, R134a isobutane water, liquid ammonia, for example and suitable gases include nitrogen, carbon dioxide, air, argon, and ammonia gas for example.

As show, the gas component undergoes polytropic compression 5 and a portion the resulting compression heat is captured by the liquid phase. Heat transfer between the phases is facilitated BY the type of two-phase flow. In a certain embodiment, the phases contact each other in a dispersed two-phase flow, whereas in another embodiment they contact each other in transient two-phase flow, and in another embodiment, in separate two-phase flow. In this manner substantially all preliminary heat compression generated is preserved in either the gas phase or in the liquid phase In a certain embodiment, heat transfer between the phases is substantially complete so that each working fluid is at substantially the same temperature prior to proceed to the next process stage.

After polytropic compression 5, the two-phase working fluid is separated 7 into a working gas and a working liquid.

The working gas is further heated 9a with external high temperature heat and then adiabatically expanded 13a with a heat content derived from both the polytropic compression and the additional heat. The expanded gas is re-heated with high-temperature external heat 9c and re-expanded adiabatically 13c for additional work extraction. The expanded gas is recycled for additional polytropic compression 5.

The working liquid is further pressurized 11 in a certain embodiment, and vaporized 9b with high-temperature external heat. The vaporized working liquid is then adiabatically expanded 13b with a combined heat content and work extracted. Additional work is extracted through condensation 10 back into working liquid. The condensate working liquid is recycled and combined with the recycled, work-extracted working gas to combine into a two-phase working fluid prior to reiterative polytropic compression 5, as noted above.

Figure 3:
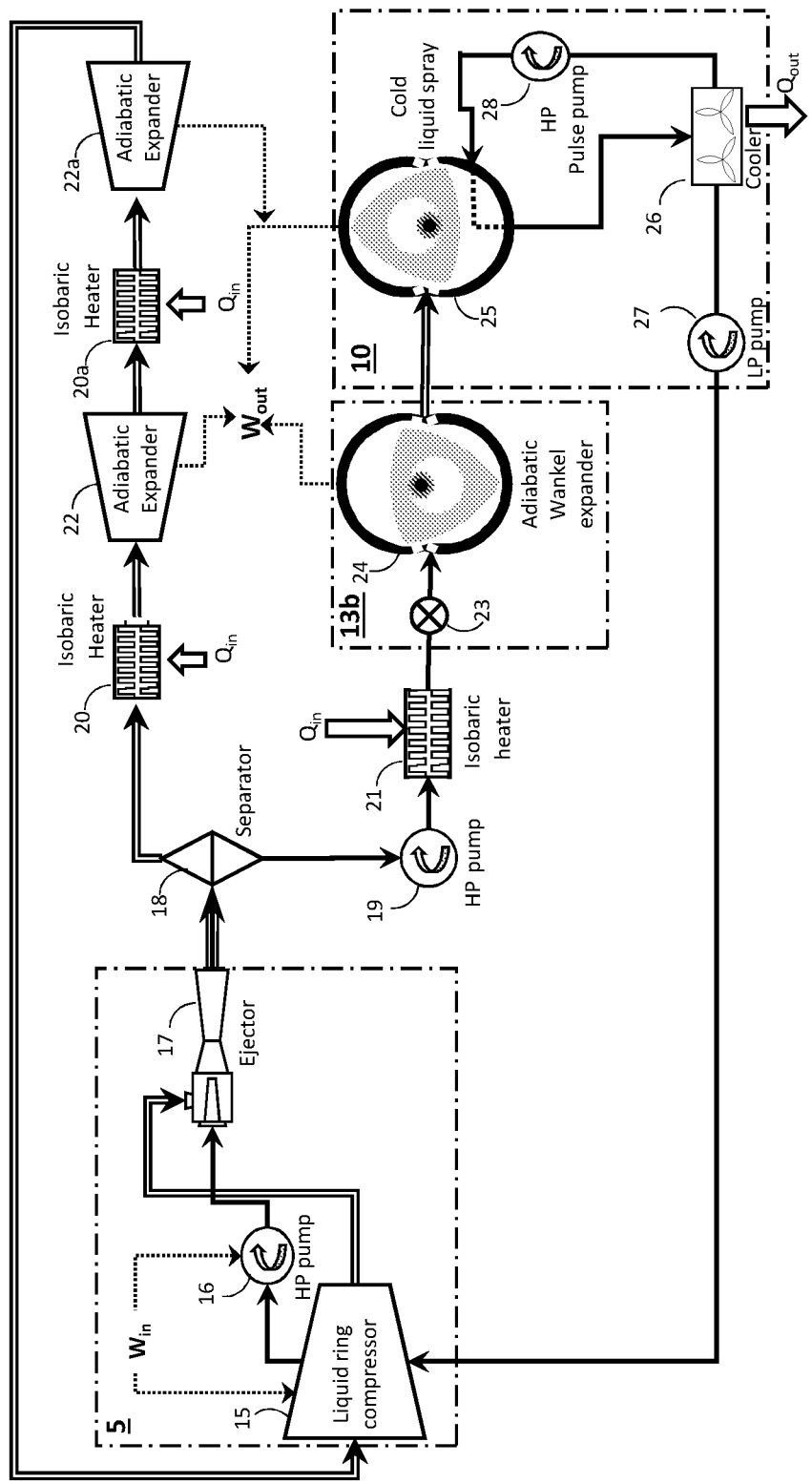
FIG. 3 is a schematic diagram of a physical implementation of the heat engine cycle of FIG. 2, according to an embodiment.

FIG. 3 is a schematic depiction of a physical implementation of the process scheme depicted in FIG. 2, according to an embodiment.

Polytropic compression 5 is implemented as a compression unit having a liquid ring compressor 15, a high-pressure pump 16, and a venturi ejector 17, in a certain embodiment. It should be appreciated that in a certain other embodiment the polytropic compression unit is implemented with a high-pressure pump and venturi ejector while in another embodiment the compression unit is implemented with only a liquid ring compressor.

Liquid ring compressor 15 is configured to discharge working liquid to high pressure pump 16 where the working liquid is pressured and driven through venturi ejector 17 creating a suction drawing in the compressed working gas and ejecting a two-phase working fluid. A portion of the compression heat of the working gas is captured by the working liquid during contact through the venturi ejector such that the two-phase working fluid is loaded with substantially all the heat generated during all compression stages thereby increasing work yield in future expansion.

After polytropic compression, the two-phase working fluid undergoes separation into separate gas and liquid components at separator 18.

Isobaric heating of the working gas is implemented at heat exchanger 20 and adiabatic expansion and work extraction is implemented at expander 22. Additional, isobaric heating of the expanded working gas is implemented at second isobaric heater 20a and subsequent adiabatic expansion is implemented at adiabatic expander 22a. It should be appreciated that expander 22 or 22a may be implemented as one or more linked pistons, expanders, turbines, screw expanders or other expansion equipment providing similar functionality. One or more serially linked expanders are deemed as an expander set.

Working liquid separated from the two-phase working fluid at separator 18 is pressurized at high pressure pump 19, in a certain embodiment, and vaporized at isobaric heater 21 with the addition of heat $Q_{in}$ sufficient to vaporize the working liquid. Adiabatic expansion 13b is achieved through intermittent feed of the vaporized working liquid into Wankel expander 24 by means of control valve 23, in a certain embodiment. As noted, in certain embodiments, using other types expansion equipment is employed.

After adiabatic expansion additional work is extracted in condensation unit 10. Condensation unit 10 includes a Wankel condenser 25, an isobaric cooler 26, and a high-pressure pulse pump 26, according to an embodiment. The vaporized working liquid is condensed in a Wankel condenser 25 and a portion of the condensate is cooled at isobaric cooler 26 where heat is discharged to the surroundings. The cooled condensate is ejected onto the Wankel cooler by high-pressure pump 28 to provide instantaneous cooling of the vaporized working liquid while extracting additional work of condensation. In certain embodiments, condensation is achieved in the absence of work extraction.

Low pressure pump 27 recycles the now working liquid to the polytropic compression unit 5 for polytropic compression.

Figures 4A, 4B:
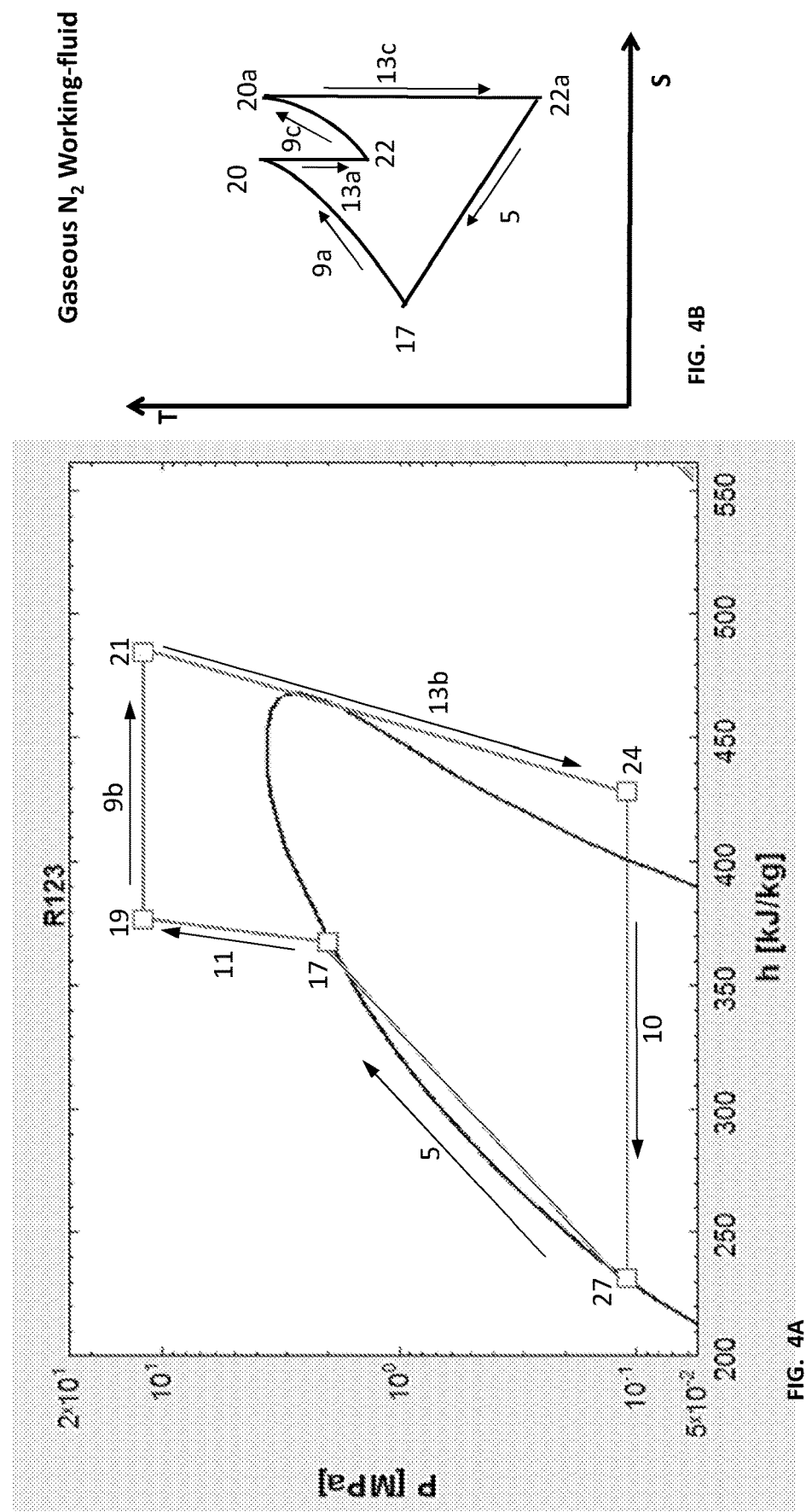
FIG. 4A is a pressure-enthalpy diagram of a simulation of the embodiment depicted in FIGS. 2-3, according to an embodiment.
FIG. 4B is a temperature-entropy diagram of a simulation of the embodiment depicted in FIGS. 2-3, according to an embodiment.

FIG. 4A are FIG. 4B pressure-enthalpy and temperature-entropy diagrams, respectively, for a simulation of the embodiment set forth in FIGS. 2-3. The cycle segment labels correspond to the processes set in FIG. 2 and the cycle endpoints correspond to working fluid conditions at the outlets of the corresponding process equipment set forth in FIG. 4. Conditions for the liquid phase for the working fluid are set forth in Table 1 below:

TABLE 1

LIQUID PHASE WORK CYCLE
Refrigerant R123
1.181 kg.

| | P (Mpa) | T (C. °) | H (kj/kg) | Heat (kJ) | Work (kJ) |
|---|---|---|---|---|---|
| Inlet ring compressor 15 | 0.11 | 30.0 | 231.4 | 0.00 | 0.00 |
| Outlet ring compressor 15 | 2.0 | 146.5 | 367.2 | 160.38 | 0.00 |
| Adiabatic pump outlet 19 | 12.0 | 157.6 | 376.3 | 0.0 | 10.75 |
| Isobaric boiler outlet 21 | 12.0 | 240 | 484.6 | 127.90 | |
| Adiabatic expander outlet 24 | 0.11 | 55 | 427.8 | 0.00 | −67.0 |

TABLE 1-continued

LIQUID PHASE WORK CYCLE
Refrigerant R123
1.181 kg.

| | P (Mpa) | T (C. °) | H (kj/kg) | Heat (kJ) | Work (kJ) |
|---|---|---|---|---|---|
| Isobaric condenser outlet 27 | 0.11 | 30 | 231.4 | −231.95 | |
| | | | | 56.33 | −56.33 |

The efficiency in the liquid-phase working-fluid is set forth in Table 2 below:

TABLE 2

LIQUID PHASE WORK CYCLE
Refrigerant R123
1.181 kg.
Efficiencies

| Work of condensation (kJ) | Net work (kJ) | Efficiency (%) | Carnot efficiency (%) |
|---|---|---|---|
| 21.26 | 56.33 | 19.5 | 40.9 |

The condition of the gas-phase working fluid are set forth in the Table 3 below:

TABLE 3

GAS-PHASE WORK CYCLE
Nitrogen
0.856 kg

| | P (Mpa) | T (C. °) | Heat (kJ) | Work (kJ) |
|---|---|---|---|---|
| Outlet ring compressor 17 | 2.00 | 146.5 | −160.38 | 234.39 |
| Isobaric boiler outlet 20 | 2.00 | 240 | 83.17 | |
| Adiabatic expander outlet 22 | 0.70 | 106.20 | | −108.79 |
| Isobaric boiler outlet 20a | 0.70 | 240.00 | 119.04 | |
| Adiabatic expander outlet 22a | 0.11 | 30.000 | | −167.43 |
| | | | 41.83 | −41.83 |

The increase in efficiency achieved with the two-phase working-fluid relative to a single liquid phase working fluid is set forth tin Table 4 below:

TABLE 4

Integrated Efficiency of Liquid R123 and
Gaseous Nitrogen

| Integrated Efficiency (%) | Integrated Total Efficiency (%) | Efficiency Gain Relative to Single R123 Working Stream (%) |
|---|---|---|
| 29.7 | 36.2 | 85.6 |

Figure 5:
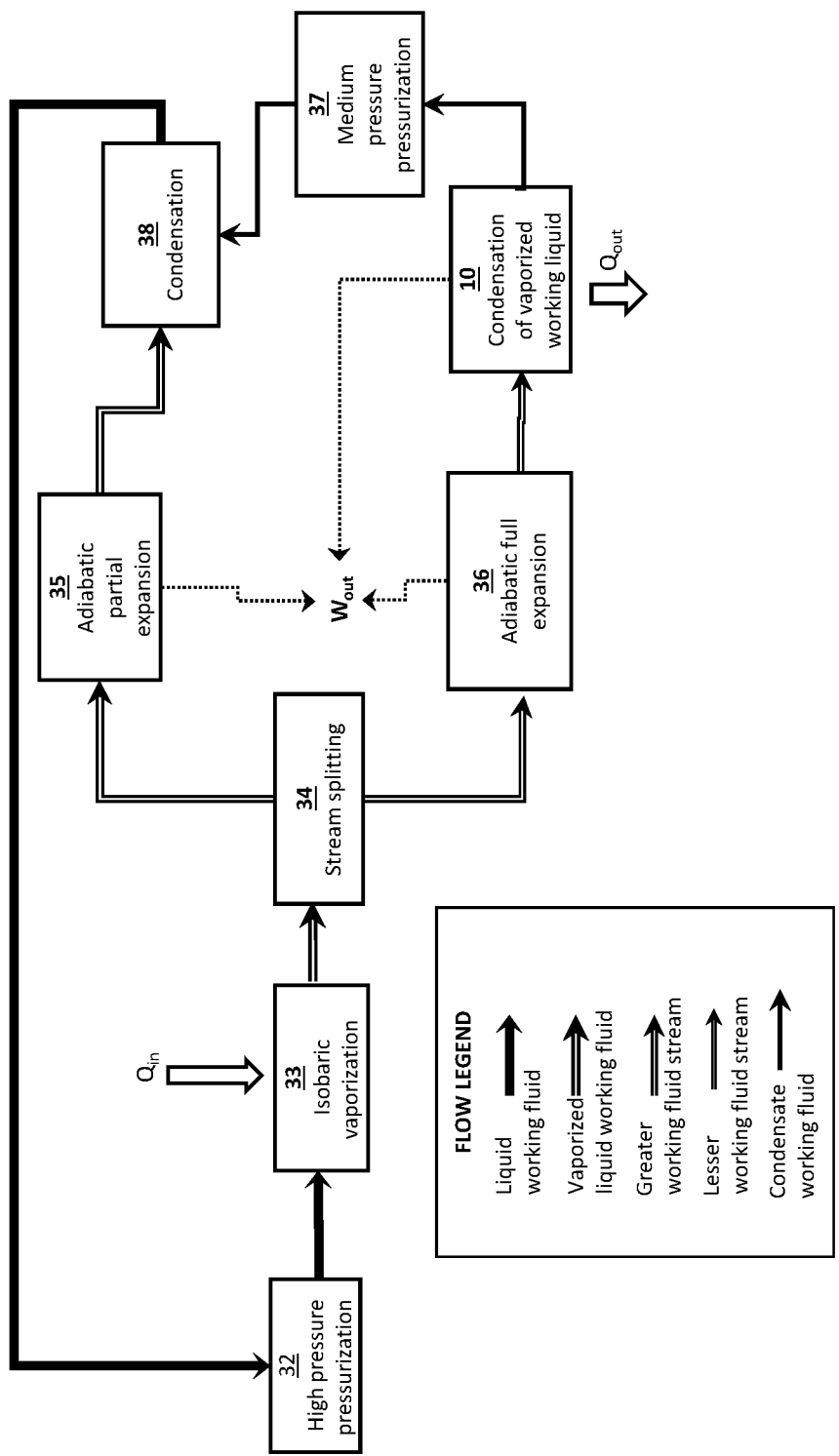
FIG. 5 is a block flow diagram of a second embodiment of a heat engine cycle employing a two-component working fluid, in which the two-component working fluid is implemented as a liquid-liquid working fluid of the same identity, according to an embodiment.

FIG. 5 is a block flow diagram of an embodiment of the heat engine in which the two-component working fluid is implemented as two liquids having the same identity. Suitable working liquids include the above noted substances.

As shown, the two liquid working fluids are merged into a single liquid stream during pressurization 32 and isobaric heating 33 where the merged liquid steam is vaporized. The vaporized liquid stream is then split 34 into two streams of unequal mass flow, in an embodiment. Both streams are adiabatically expanded in parallel; however, the stream of lesser mass flow is partially expanded 35 while the stream of greater mass flow is fully expanded 36. The full expansion advantageously reduces heat ejection to the surroundings in subsequent condensation 10. After condensation 10, the condensate is pressurized 37 and brought into physical contact with the partially expanded, vaporized liquid stream, causes its condensation 38, and merges with the new condensate. Condensation heat released is captured by the pressurized condensate and advantageously pre-heats the pressurized condensate and then merges with the new condensate to form a single liquid working stream. The combined liquid working stream is recycled for pressurization 32 as shown.

It should be appreciated that in a certain embodiment the stream splitting is implemented into streams of equivalent mass flow. In regard to condensation work, a certain other embodiment extracts work at only one of the work streams, whereas work is not extracted during condensation. Furthermore, in a certain embodiment, heat is rejected to the surroundings from both work streams.

Figure 6:
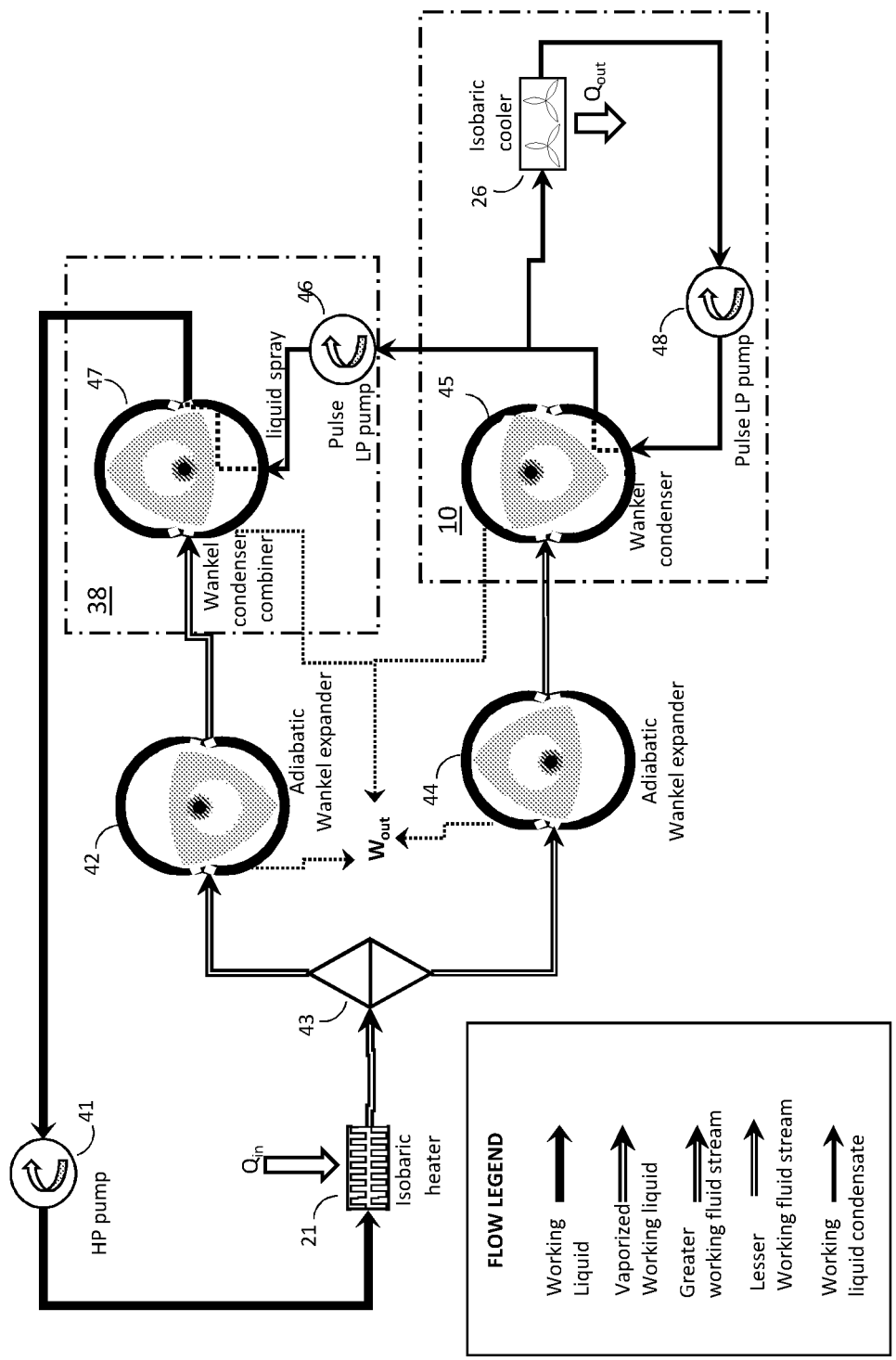
FIG. 6 is a schematic diagram of a physical implementation of the heat engine cycle of FIG. 5, according to an embodiment.

FIG. 6 is a schematic depiction of a non-limiting implementation of the schematic, block flow diagram FIG. 5.

As shown, a merged liquid working stream is pressurized at high pressure pump 41, vaporized at isobaric heater 21, and divided into a first working fluid and a second working fluid at splitter 43 of unequal mass flow.

As shown, each of the working streams is separately, adiabatically expanded in parallel in adiabatic Wankel expanders 42 and 44. Expander 44 is configured to operate at a greater expansion ratio than that of expander 42. After expansion at expander 44, the second working fluid is condensed in Wankel condenser 45 through contact with available liquid working fluid, as shown in block 10. Condensation inside Wankel condenser 45 advantageously extracts additional work from the second working stream, even after prior expansion at Wankel expander 44. As shown, a portion of the resulting condensate is further cooled in an isobaric cooler 26, where waste heat is ejected to the surroundings, and recycles to cool the working stream in condenser 45 after pressurization at low pressure pulse pump 48. As shown, the condensate of the second working fluid is pressurized at low pressure pulse pump 46 and pulse injected into Wankel condenser combiner 47 to condense the first working fluid in the presence of work extraction. Advantageously, the condensate of the second working fluid combines with the first working fluid at expander combiner 47 so that heat released from the condensing work stream is captured by the cooling condensate. The capture of this heat constitutes preliminary heating of the cooler condensate stream prior to additional heating as a portion of a merged condensate. The merged condensates are recycled as a single liquid working stream to isobaric heater 21 for re-vaporization.

Figure 7:
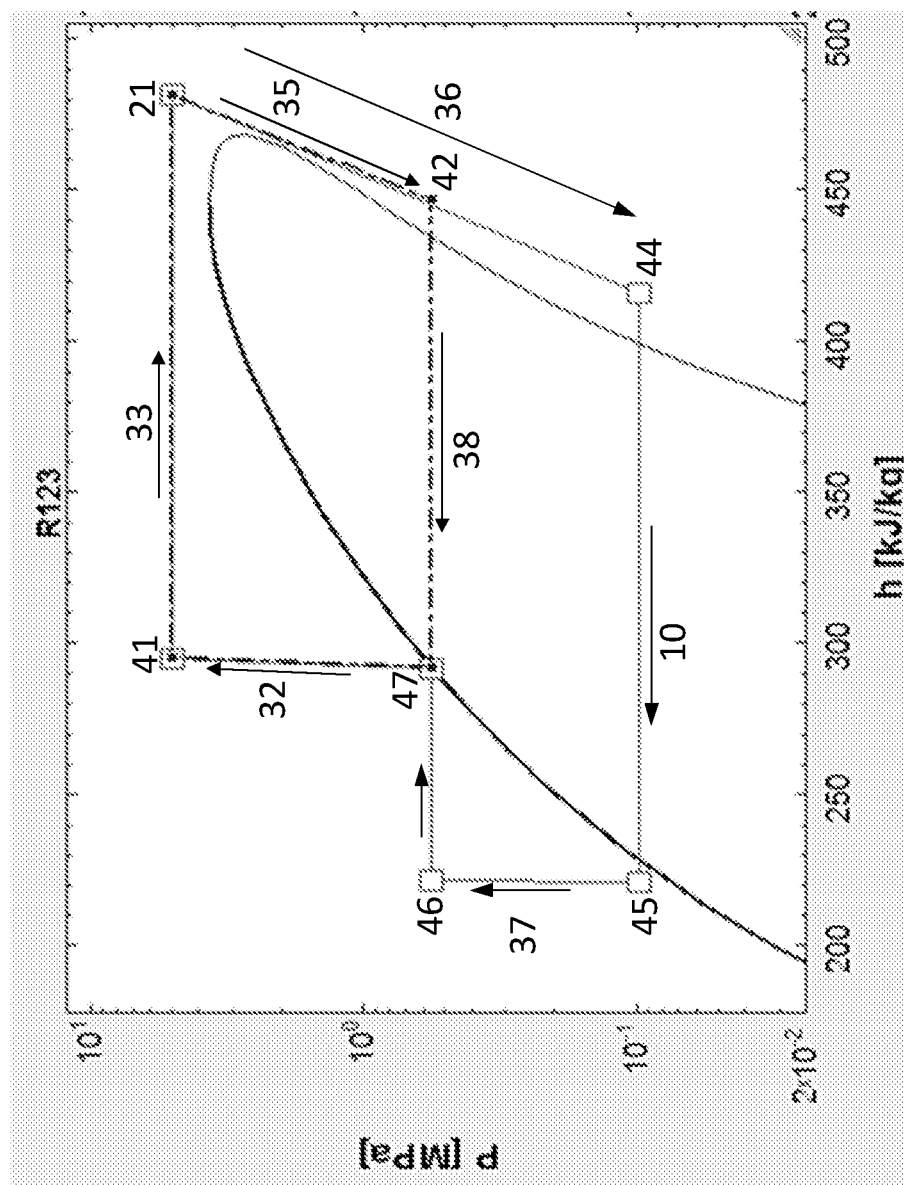
FIG. 7 is a pressure-enthalpy diagram of a simulation of the embodiment depicted in FIGS. 5-6, according to an embodiment.

FIG. 7 is pressure-enthalpy diagram depicting a simulation of work cycles of the embodiment depicted in FIGS. 5-6 in accordance with the labelling convention set forth above. Table 5 bellow sets forth the operating conditions and efficiencies for the work-cycle.

TABLE 5

REFRIGERANT R123
Primary work-cycle
2.216 kg.

| | P (Mpa) | T (C. °) | H (kj/kg) | Heat (kJ) | Work (kJ) |
|---|---|---|---|---|---|
| Pump outlet 46 | 0.56 | 20.2 | 221.3 | 0.0 | 0.7 |
| Boiler outlet 47 | 0.56 | 85.5 | 291.3 | 155.0 | 0.0 |
| Pump outlet 41 | 5.0 | 88.0 | 294.7 | 0.0 | 8.0 |
| Expander outlet 21 | 5.0 | 210.0 | 481.4 | 413.7 | 0.0 |
| Boiler outlet 44 | 010 | 50.0 | 415.8 | 0.0 | −145.4 |
| Condenser outlet 45 | 010 | 50.0 | 221.0 | −432 | 0.0 |
| | | | | 137.2 | −137.2 |

Efficiencies

| Work of condensation (kJ) | Net work (kJ) | Efficiency (%) | Carnot efficiency (%) |
|---|---|---|---|
| 37.5 | 137.2 | 24.1 | 39.3 |

As shown the efficiency as is known in the art.

Following, Table 6 sets forth operating parameters and efficiencies for secondary work-cycle.

TABLE 6

REFRIGERANT R123
Secondary work-cycle
1.0 kg

| | P (Mpa) | T (C. °) | H (kj/kg) | Heat (kJ) | Work (kJ) |
|---|---|---|---|---|---|
| Pump outlet 41 | 5.0 | 88.0 | 295.2 | 0.0 | 3.4 |
| Boiler outlet 21 | 5.0 | 210.0 | 481.4 | 186.2 | 0.0 |
| Expander outlet 42 | 0.56 | 100.0 | 446.8 | 0.0 | −34.6 |
| Condenser outlet 47 | 0.56 | 85.5 | 291.8 | −155.0 | 0.0 |
| | | | | 31.2 | −31.2 |

TABLE 6-continued

REFRIGERANT R123
Secondary work-cycle
1.0 kg

| Efficiencies | | | |
|---|---|---|---|
| Work of condensation (kJ) | Net work (kJ) | Efficiency (%) | Carnot efficiency (%) |
| 17.5 | 31.2 | 16.8 | 25.8 |

Following, Table 7 sets forth operating parameters and efficiencies for integrated work-cycle.

TABLE 7

Efficiencies of Integrated
Primary and Secondary Working-streams
Mass 3.2 kg

| Efficiency without condensation (%) | Efficiency with condensation (%) | Efficiency gain relative to a regular cycle efficiency without condensation (%) | Efficiency gain relative to a standard cycle efficiency with condensation (%) |
|---|---|---|---|
| 28.1 | 37.2 | 16.6 | 54.4 |

As shown, efficiency of the integrated working streams advantageously provides an efficiency gain relative to the efficiency of a standard single working-stream (Described here as a primary working-stream) by more than 16% and when implemented with work yielding condensation a much higher efficiency of over 54% is achieved.

Figure 8:
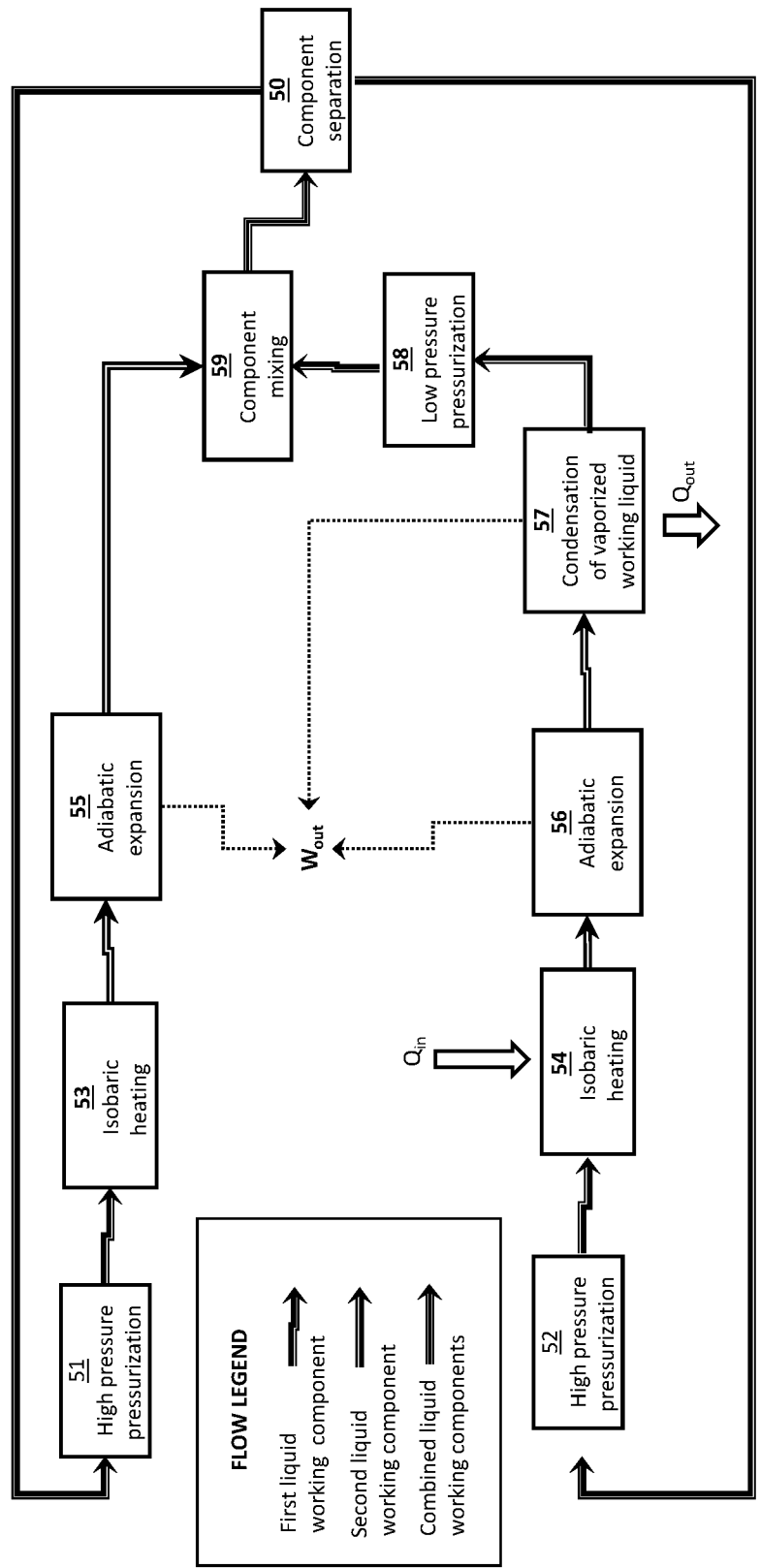
FIG. 8 is a block flow diagram of a variant embodiment of a heat engine cycle employing a liquid-liquid working fluid in which the two liquids have different identities, according to an embodiment.

FIG. 8 is a block process diagram depicting a variant embodiment of the engine employing a two-component liquid working fluid in which the two liquids having different identities like water plus R123, water plus Toluene, and various other immiscible liquids.

As shown, each of the two components of the working fluid, in parallel are separately pressurized 51 and 52 to a high pressure, isobarically vaporized 53 and 54, and adiabatically expanded 55 and 56, respectively. As shown, second liquid working component is condensed 57 and optionally and produces work though the condensation as described above. The resulting condensate is pressurized and combined with first liquid component at combiner 59. The mixing of the condensate of the second liquid component with the vaporized, partially expanded, first liquid component condenses the first component while capturing condensation heat released as noted above. The condensate mixture is separated 50 and each component is recycled.

Figure 9A:
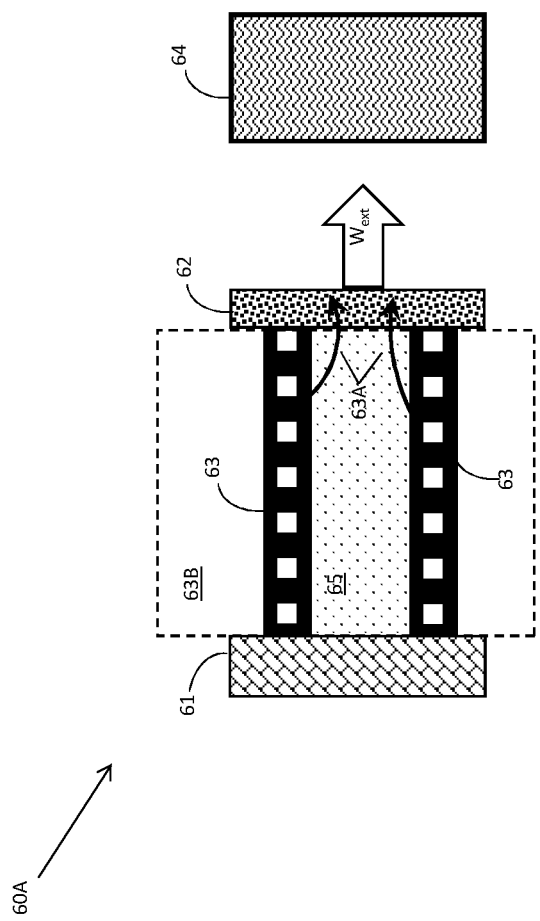
FIG. 9A is a schematic, cross-sectional view of a third embodiment of heat engine employing a two-component working fluid in which the two-component working fluid is implemented as a gas—and a solid working fluid, according to an embodiment.

FIG. 9A is a schematic, cross-sectional view of third embodiment of the engine employing two-component working fluid in which one component is implemented as flexible solid and the second component is implemented as a pressurized gas.

As shown, engine 60 includes a fixed anchor 61 linked to a solid working fluid 63 (Also referred to as solid working-body), linked to a heat block 62 and an external heat source 64 providing additional heat. By way of example, external heat source 64 is implemented as a heating block and the terms "heating block" and "external heat source" are used interchangeably. In a certain embodiment, solid working fluid 63 is implemented as a heat-conductive, shape-memory alloy disposed in a rubber sleeve or synthetic or non-synthetic elastomeric materials. An exemplary shape memory material includes nickel-titanium alloy like nitinol; however, it should be appreciated that in other embodiments a variety of shape memory allows are employed. Heat block 62 is implemented with materials possessing high heat capacities and high thermal conductivity like aluminum alloys such as 1050A, 6060, 6061 and 6063, copper, diamond, or various composite materials such as a copper-tungsten, AlSiC (silicon carbide in aluminium matrix), Dymalloy (diamond in copper-silver alloy matrix), and E-Material (beryllium oxide in beryllium matrix).

In operation, application of preliminary work $W_{prel}$ to solid working fluid 63 such that it is stretched out of its original shape and generates work heat 63A at low temperature which is captured by high-heat capacity heat block 62 at a temperature less than working-body 63. Preliminary work $W_{prel}$ is applied through a spring arrangement or various biasing elements providing such functionality.

Figures 9B, 9C:
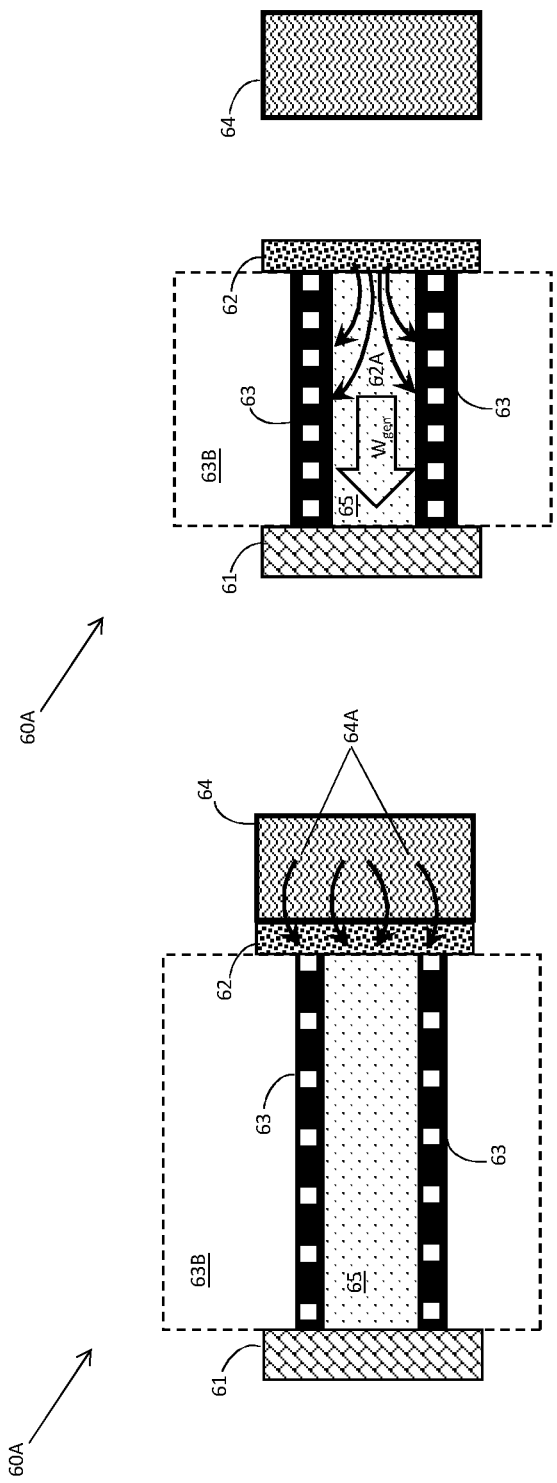
FIG. 9B is a schematic, cross-sectional view of the engine of FIG. 9A during the application of preliminary work, according to an embodiment.
FIG. 9C is a schematic, cross-sectional view of the engine of FIG. 9A during external heating, according to an embodiment.

FIG. 9B depicts external heating of heat block 62 upon stretching solid working-body 63 to a threshold distance in which heat block 62 is in a state of abutment with external heating block 64. Upon abutment, high temperature external heat 64A is transferred from external heating block 64 into heat block 62 to advantageously raise the temperature of the low temperature heat 63A generated from preliminary work $W_{pre}$ as noted above.

FIG. 9C depicts the transfer of combined heat 62A from heat block 62 to solid working fluid 63 and the generation of work $W_{gen}$ from heat-induced contraction of solid working fluid 63, as noted above.

FIG. 9D depicts the transfer of contraction heat 63C to gas component 65 of composite working body 63B. The collective unit of elastomeric and shape memory alloy 63 generates work through contraction responsively to combined heat 62A received from heat element or block 62. Contraction heat 63C is formed from residual combined heat 62A remaining after contraction of solid working-body 63 and dissipates into gas component 65 of composite working-body 63B. Gas 65 expands responsively and generates work in $W_{gen}$ in the opposite direction such that the reoccurring heating and cooling of composite working-body 63B advantageously drives a linearly reciprocating engine, according to an embodiment. It should be appreciated that heat transfer from the external heating block 64 to the heat block 62 is implemented in a manner minimizing heat transfer to the gas and maximizing heat transfer specifically to solid working-body 63 through heat pipes or other provisions as is known to those skilled in the art. Similarly, heat transfer from solid working-body 63 to gas component 65 of the composite working-body 63B is implemented in a manner minimizing heat loss to surroundings and return heat flow to heat block 63 as is known to those skilled in the art.

It should be appreciated the complementary functionality of gas component 65 in regards to both contraction and expansion of working-body 63. Specifically, during contraction of working-body 63, gas 65 is also compressed and yields compression heat that is captured by contracting body 63 which further facilitates contraction.

Upon the next reiteration, preliminary work applied in the form of tension is applied to working-body 63 generated work heat is captured by the compressed gas now expanding and thereby further facilitates expansion of working-body 63.

FIG. 9E depicts the engine in an external heating state as noted above in which heat transfer from external heating block 64 augments work heat 63A generated from stretching solid working-body 63 and absorbed in heat block 62 as heated gas 65 drives expansion of the composite working-body 63B, according to an embodiment.

Figure 10:
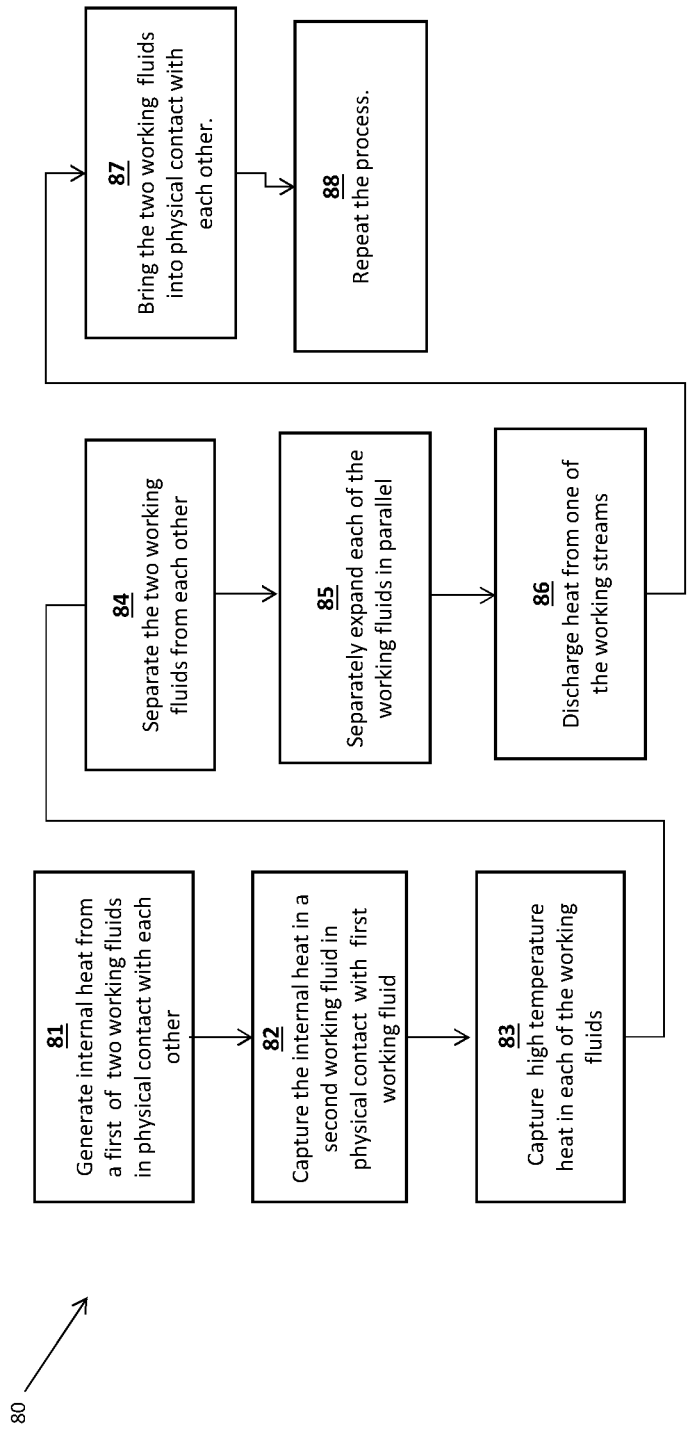
FIG. 10 is a flow chart depicting steps employed in an embodiment of the heat engine.

FIG. 10 is a flow chart 80 depicting the steps employed in an embodiment of the heat engine. This is implemented in different ways depending on the working fluid employed; compression or condensation for gas, pressurization for liquid, contracting and expansion for elastic solids.

In step 81, generate internal heat in a first of two working fluids in physical contact with each other. In step 82, capture the internal heat in a second working fluid in physical contact with first working fluid. In step 83, capture high temperature heat in each of the working fluids prior to expansion. In step 84, separate the two working fluids from each other to facilitate subsequent separate and parallel work yielding expansion. In step 85, separately expand each of the working fluids in parallel. In step 86, cool one of the working fluid streams and discharge heat to the surroundings. In step 87, bring the two working fluids into physical contact with each other. In step 88, recycle the working fluids to repeat the process.

It should be appreciated that features set forth in a particular embodiment also have application in other embodiments. In which those features are not mentioned.

It should be appreciated that such regenerative heating schemes in certain embodiments are also employed in cylinder based embodiments of the heat engine.

Figure 11:
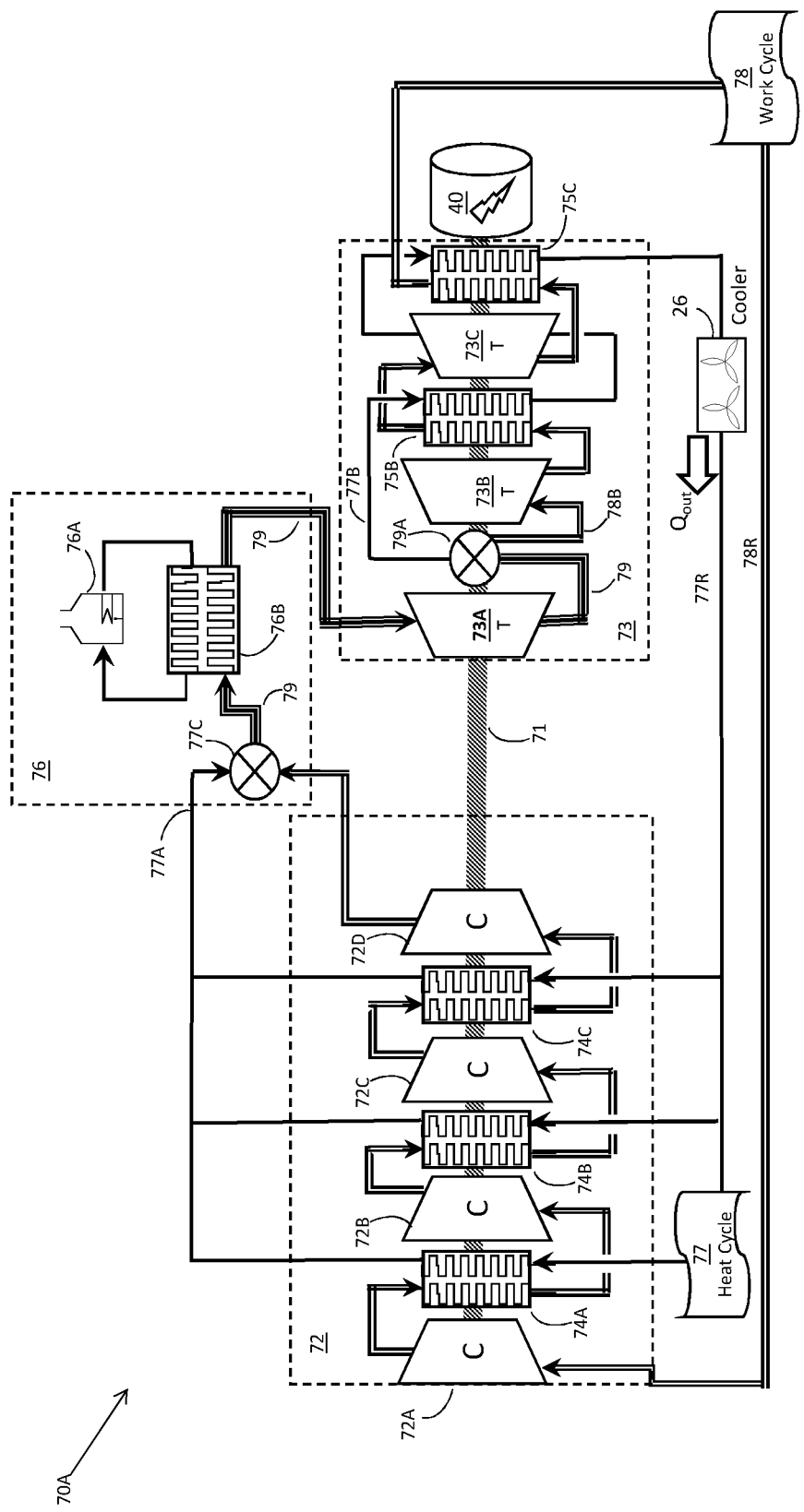
FIG. 11 is schematic diagram of a turbine-based embodiment of the heat-engine operative in accordance with a Brayton cycle employing a composite working fluid and heat-transfer medium, according to an embodiment.

FIG. 11 depicts is schematic diagram of a turbine-based heat-engine 70 operative in accordance with a Brayton cycle, according to an embodiment.

This embodiment includes a work cycle 78 of a working fluid 78R circulating through a bank of serially connected compressors 72A-72D and a bank of serially linked turbines 73A-73C linked to a rotatable shaft 71 optionally driving a generator 40 and an optional pressurized storage tank 78S.

A heat cycle 77 includes a heat-transfer medium 77R circulating through a bank of compression coolers 74A-74C, a bank of expansion heaters 75A-75D, and heat charger 76B in thermal communication with a heat source 76A, cooler 26, and an optional heat storage unit 77S.

In operation, working fluid 78R circulating through work cycle 78 is reiteratively compressed and cooled at each step of a compression stage 72. Specifically, working fluid is adiabatically compressed at compressor 72A and isobarically cooled at compression cooler 74A by heat circulating transfer medium and recompressed in compressor 72B and isobarically re-cooled in compression cooler 74B. Similarly, adiabatic compression and subsequent isobaric cooling are performed at each of the compressor/cooler pairs of compression stage 72; compressor 72C and compression cooler 74C plus compressor 72D. It a certain embodiment additional compressor/cooler pairs are employed while in a certain other embodiment fewer compressor/cooler pairs are employed. It should be appreciated that in an embodiment employing isochoric heating, a flow valve operative to supply batch portions of working to expansion heater is utilized.

As shown, heat-transfer medium now loaded with compression heat captures additional heat at a temperature exceeding that of the compression heat. The additional heat is provided by a heat source 76A and transferred to heat-transfer medium though heat charger 76B so that the heat-transfer medium now carries the combined heat of compression and additional heat at a temperature exceeding that of the compression heat and less than the temperature at which the additional heat is provided.

During the work extraction of expansion stage 73 the working fluid is isobarically heated at each of expansion heaters 75A-75C with the combined heat immediately prior to adiabatic expansion at turbines 73A-73C. A post expansion heating is implemented at expansion heater 75D to further cool the heat-transfer medium to a temperature less than the compression heat temperature to create the temperature gradient enabling further capture of compression heat. It should be appreciated that in a certain embodiment additional turbine-expansion heater pairs are employed while in yet another embodiment fewer turbine-expansion heater pairs are employed.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A heat engine exploiting condensation heat of working fluid, the engine comprising:
    a first pump operative to pressurize a liquid working fluid;
    a heater operative to vaporize the liquid working fluid into a vapor working fluid;
    a stream splitter operative to split the vapor working fluid into a first vapor working fluid and a second vapor working fluid;
    a first expander configured to operate at a first expansion ratio during expansion of the first vapor working fluid to produce a partially expanded first vapor working fluid;
    a second expander configured to operate at a second expansion ratio greater than the first expansion ratio during expansion of the second vapor working fluid in a stream parallel to the first vapor working fluid;
    an isobaric Wankel condenser operative to condense the expanded second vapor working fluid so as to form a condensate;
    a second pump operative to pressurize the condensate into a pressurized condensate; and
    an isobaric condenser combiner operative to contact the pressurized condensate with the partially expanded first vapor working fluid so as to form the liquid working fluid.

2. A heat engine exploiting condensation heat of working fluid, the engine comprising:
    a first pump operative to pressurize a liquid working fluid;
    a heater operative to vaporize the liquid working fluid into a vapor working fluid;
    a stream splitter operative to split the vapor working fluid into a first vapor working fluid and a second vapor working fluid;
    a first expander configured to operate at a first expansion ratio during expansion of the first vapor working fluid to produce a partially expanded first vapor working fluid;
    a second expander configured to operate at a second expansion ratio greater than the first expansion ratio during expansion of the second vapor working fluid in a stream parallel to the first vapor working fluid;
    a condenser operative to condense the expanded second vapor working fluid so as to form a condensate;
    a second pump operative to pressurize the condensate into a pressurized condensate; and an isobaric Wankel condenser combiner operative to contact the pressurized condensate with the partially expanded first vapor working fluid so as to form the liquid working fluid.

* * * * *